US009407891B2

(12) United States Patent
Barton et al.

(10) Patent No.: US 9,407,891 B2
(45) Date of Patent: Aug. 2, 2016

(54) ONE-TOUCH RECORDING OF A PROGRAM BEING ADVERTISED

(75) Inventors: Jim Barton, Los Gatos, CA (US); Kevin Smith, Mountain View, CA (US); David Chamberlin, Pacifica, CA (US); Howard Look, Palo Alto, CA (US)

(73) Assignee: TiVo Inc., Alviso, CA (US)

( * ) Notice: Subject to any disclaimer, the term of this patent is extended or adjusted under 35 U.S.C. 154(b) by 19 days.

(21) Appl. No.: 13/267,855

(22) Filed: Oct. 6, 2011

(65) Prior Publication Data

US 2012/0027383 A1 Feb. 2, 2012

Related U.S. Application Data

(60) Continuation of application No. 12/572,023, filed on Oct. 1, 2009, now Pat. No. 8,453,193, which is a continuation of application No. 11/182,135, filed on Jul. 14, 2005, now Pat. No. 7,986,868, which is a
(Continued)

(51) Int. Cl.
*H04N 9/82* (2006.01)
*H04N 9/79* (2006.01)
(Continued)

(52) U.S. Cl.
CPC .............. *H04N 9/79* (2013.01); *G11B 27/034* (2013.01); *G11B 27/105* (2013.01); *G11B 27/28* (2013.01); *G11B 27/322* (2013.01); *H04N 5/445* (2013.01); *H04N 5/44543* (2013.01); *H04N 5/76* (2013.01); *H04N 7/088* (2013.01); *H04N 7/165* (2013.01); *H04N 21/235* (2013.01); *H04N 21/4147* (2013.01); *H04N 21/4305* (2013.01);
(Continued)

(58) Field of Classification Search
CPC H04N 5/445; H04N 21/47214; H04N 7/0887
USPC .................................................. 386/248, 291
See application file for complete search history.

(56) References Cited

U.S. PATENT DOCUMENTS 4,233,628 A 11/1980 Ciciora
4,306,250 A 12/1981 Summers et al.
(Continued)

FOREIGN PATENT DOCUMENTS

EP 0692909 1/1996
EP 0744866 11/1996
(Continued)

OTHER PUBLICATIONS

Japanese Office Action received in International Application No. 2011-253349 dated Aug. 28, 2012 (11 pages).
(Continued)

*Primary Examiner* — David Harvey
(74) *Attorney, Agent, or Firm* — Wong & Rees LLP

(57) ABSTRACT

A closed caption tagging system provides a mechanism for inserting tags into an audio or video television broadcast stream prior to or at the time of transmission. The receiver receives the broadcast stream and detects and processes the tags within the broadcast stream which is stored on a storage device that resides on the receiver. The tags contain command and control information that the receiver translates and acts upon. A one-touch recording option is provided. An icon is displayed to the viewer telling the viewer that an advertised program is available for recording at a future time. The viewer presses a single button on an input device causing the receiver to schedule the program for recording.

33 Claims, 22 Drawing Sheets

Related U.S. Application Data division of application No. 09/665,921, filed on Sep. 20, 2000, now Pat. No. 7,889,964, which is a continuation-in-part of application No. 09/126,071, filed on Jul. 30, 1998, now Pat. No. 6,233,389.

(60) Provisional application No. 60/154,713, filed on Sep. 20, 1999.

(51) Int. Cl.

| | | |
|---|---|---|
| G11B 27/034 | (2006.01) | |
| G11B 27/10 | (2006.01) | |
| G11B 27/28 | (2006.01) | |
| G11B 27/32 | (2006.01) | |
| H04N 5/445 | (2011.01) | |
| H04N 5/76 | (2006.01) | |
| H04N 7/088 | (2006.01) | |
| H04N 7/16 | (2011.01) | |
| H04N 21/235 | (2011.01) | |
| H04N 21/4147 | (2011.01) | |
| H04N 21/43 | (2011.01) | |
| H04N 21/432 | (2011.01) | |
| H04N 21/435 | (2011.01) | |
| H04N 21/44 | (2011.01) | |
| H04N 21/45 | (2011.01) | |
| H04N 21/454 | (2011.01) | |
| H04N 21/458 | (2011.01) | |
| H04N 21/472 | (2011.01) | |
| H04N 21/6543 | (2011.01) | |
| H04N 21/6587 | (2011.01) | |
| H04N 21/81 | (2011.01) | |
| H04N 21/84 | (2011.01) | |
| H04N 21/845 | (2011.01) | |
| H04N 5/775 | (2006.01) | |
| H04N 5/781 | (2006.01) | |
| H04N 5/782 | (2006.01) | |
| H04N 5/783 | (2006.01) | |
| H04N 5/85 | (2006.01) | |
| H04N 9/804 | (2006.01) | |
| H04N 9/806 | (2006.01) | |
| H04N 21/488 | (2011.01) | |

(52) U.S. Cl.
CPC ......... *H04N21/435* (2013.01); *H04N 21/4325* (2013.01); *H04N 21/44016* (2013.01); *H04N 21/454* (2013.01); *H04N 21/458* (2013.01); *H04N 21/4532* (2013.01); *H04N 21/47214* (2013.01); *H04N 21/6543* (2013.01); *H04N 21/6587* (2013.01); *H04N 21/812* (2013.01); *H04N 21/84* (2013.01); *H04N 21/8455* (2013.01); *H04N 21/8456* (2013.01); *H04N 5/775* (2013.01); *H04N 5/781* (2013.01); *H04N 5/782* (2013.01); *H04N 5/783* (2013.01); *H04N 5/85* (2013.01); *H04N 9/7921* (2013.01); *H04N 9/8042* (2013.01); *H04N 9/8063* (2013.01); *H04N 9/8205* (2013.01); *H04N 9/8233* (2013.01); *H04N 21/4884* (2013.01)

(56) References Cited

U.S. PATENT DOCUMENTS

| | | | |
|---|---|---|---|
| 4,488,179 A | | 12/1984 | Kruger et al. |
| 4,697,209 A | | 9/1987 | Kiewit et al. |
| 4,908,707 A | * | 3/1990 | Kinghorn ............... 348/460 |
| 4,930,158 A | | 5/1990 | Vogel |
| 4,931,865 A | | 6/1990 | Scarampi |
| 4,992,871 A | | 2/1991 | Bensch et al. |
| 5,014,125 A | | 5/1991 | Pocock et al. |
| 5,113,294 A | * | 5/1992 | Kim ............................ 386/291 |
| 5,121,476 A | | 6/1992 | Yee |
| 5,210,611 A | | 5/1993 | Yee et al. |
| 5,233,423 A | | 8/1993 | Jernigang et al. |
| 5,247,364 A | | 9/1993 | Banker et al. |
| 5,282,247 A | | 1/1994 | McLean et al. |
| 5,307,173 A | * | 4/1994 | Yuen et al. ............... 386/234 |
| 5,363,481 A | | 11/1994 | Tilt |
| 5,371,551 A | | 12/1994 | Logan et al. |
| 5,373,324 A | | 12/1994 | Kuroda et al. |
| 5,375,160 A | | 12/1994 | Guidon et al. |
| 5,400,401 A | | 3/1995 | Wasilewski et al. |
| 5,428,400 A | | 6/1995 | Landis et al. |
| 5,469,207 A | | 11/1995 | Chambers |
| 5,481,294 A | | 1/1996 | Thomas et al. |
| 5,481,296 A | | 1/1996 | Cragun et al. |
| 5,519,684 A | | 5/1996 | Iizuka et al. |
| 5,519,780 A | | 5/1996 | Woo et al. |
| 5,535,008 A | | 7/1996 | Yamagishi et al. |
| 5,537,151 A | | 7/1996 | Orr et al. |
| 5,555,441 A | | 9/1996 | Haddad |
| 5,574,662 A | | 11/1996 | Windrem et al. |
| 5,585,858 A | | 12/1996 | Harper et al. |
| 5,600,364 A | | 2/1997 | Hendricks et al. |
| 5,600,775 A | | 2/1997 | King et al. |
| 5,614,940 A | | 3/1997 | Cobbley et al. |
| 5,627,936 A | | 5/1997 | Prasad et al. |
| 5,631,743 A | * | 5/1997 | Inoue ....................... 386/239 |
| 5,644,362 A | | 7/1997 | Cornelis |
| 5,648,824 A | | 7/1997 | Dunn et al. |
| 5,659,368 A | | 8/1997 | Landis |
| 5,659,653 A | * | 8/1997 | Diehl et al. ............... 386/248 |
| 5,696,866 A | | 12/1997 | Iggulden et al. |
| 5,701,383 A | | 12/1997 | Russo et al. |
| 5,703,655 A | | 12/1997 | Corey et al. |
| 5,708,787 A | | 1/1998 | Nakano et al. |
| 5,719,982 A | | 2/1998 | Kawamura et al. |
| 5,721,933 A | | 2/1998 | Walsh et al. |
| 5,742,768 A | | 4/1998 | Gennaro et al. |
| 5,767,913 A | | 6/1998 | Kassatly |
| 5,774,170 A | | 6/1998 | Hite et al. |
| 5,805,763 A | | 9/1998 | Lawler et al. |
| 5,808,702 A | | 9/1998 | Yoshinobu et al. |
| 5,812,732 A | | 9/1998 | Dettmer et al. |
| 5,818,438 A | * | 10/1998 | Howe ................... H04N 21/472 348/E5.096 |
| 5,818,935 A | | 10/1998 | Maa |
| 5,867,205 A | | 2/1999 | Harrison |
| 5,878,141 A | | 3/1999 | Daly et al. |
| 5,892,536 A | | 4/1999 | Logan |
| 5,911,029 A | | 6/1999 | Sakaguchi et al. |
| 5,929,849 A | | 7/1999 | Kikinis |
| 5,930,493 A | | 7/1999 | Ottesen et al. |
| 5,931,908 A | * | 8/1999 | Gerba ................... H04N 5/445 348/E5.002 |
| 5,957,695 A | | 9/1999 | Redford et al. |
| 5,974,219 A | | 10/1999 | Fujita et al. |
| 5,987,210 A | | 11/1999 | Iggulden et al. |
| 5,987,509 A | | 11/1999 | Portuesi |
| 5,990,881 A | | 11/1999 | Inou et al. |
| 5,991,503 A | | 11/1999 | Miyasaka et al. |
| 5,999,225 A | | 12/1999 | Yagasaki et al. |
| 5,999,688 A | | 12/1999 | Iggulden et al. |
| 5,999,691 A | | 12/1999 | Takagi et al. |
| 6,005,603 A | | 12/1999 | Flavin |
| 6,008,802 A | | 12/1999 | Iki et al. |
| 6,018,775 A | | 1/2000 | Vossler |
| 6,052,554 A | | 4/2000 | Hendricks et al. |
| 6,058,430 A | * | 5/2000 | Kaplan ....................... 709/245 |
| 6,061,056 A | | 5/2000 | Menard et al. |
| 6,072,393 A | | 6/2000 | Todd |
| 6,072,532 A | | 6/2000 | Chieh et al. |
| 6,072,982 A | | 6/2000 | Haddad |
| 6,075,550 A | | 6/2000 | Lapierre |
| 6,094,677 A | | 7/2000 | Capek et al. |
| 6,097,441 A | | 8/2000 | Allport |
| 6,100,941 A | | 8/2000 | Dimitrova et al. |
| 6,108,042 A | | 8/2000 | Adams et al. |

(56) References Cited

U.S. PATENT DOCUMENTS

| | | | |
|---|---|---|---|
| 6,115,057 A | 9/2000 | Kwoh et al. | |
| 6,157,413 A * | 12/2000 | Hanafee et al. | 348/563 |
| 6,163,316 A | 12/2000 | Killian | |
| 6,172,605 B1 | 1/2001 | Matsumoto et al. | |
| 6,177,931 B1 | 1/2001 | Alexander et al. | |
| 6,229,532 B1 | 5/2001 | Fujii | |
| 6,243,741 B1 | 6/2001 | Utsumi | |
| 6,249,863 B1 | 6/2001 | Redford et al. | |
| 6,262,951 B1 | 7/2001 | Shimizu et al. | |
| 6,266,094 B1 | 7/2001 | Taylor, Jr. | |
| 6,285,407 B1 | 9/2001 | Yasuki | |
| 6,295,093 B1 | 9/2001 | Park et al. | |
| 6,313,854 B1 | 11/2001 | Gibson | |
| 6,320,621 B1 | 11/2001 | Fu | |
| 6,349,410 B1 | 2/2002 | Lortz | |
| 6,380,978 B1 | 4/2002 | Adams et al. | |
| 6,400,407 B1 | 6/2002 | Zigmond et al. | |
| 6,404,977 B1 | 6/2002 | Iggulden | |
| 6,412,111 B1 * | 6/2002 | Cato | 725/137 |
| 6,442,328 B1 | 8/2002 | Elliott et al. | |
| 6,473,903 B2 | 10/2002 | Balakrishnan et al. | |
| 6,480,353 B1 | 11/2002 | Sacks et al. | |
| 6,480,667 B1 | 11/2002 | O'Connor | |
| 6,496,981 B1 | 12/2002 | Wistendahl et al. | |
| 6,535,465 B1 | 3/2003 | Shigetomi et al. | |
| 6,546,556 B1 | 4/2003 | Kataoka et al. | |
| 6,637,032 B1 | 10/2003 | Feinleib | |
| 6,694,200 B1 | 2/2004 | Naim | |
| 6,698,020 B1 | 2/2004 | Zigmond et al. | |
| 6,788,882 B1 | 9/2004 | Geer et al. | |
| 6,832,388 B1 | 12/2004 | Du Val | |
| 6,839,851 B1 | 1/2005 | Saitoh et al. | |
| 6,895,166 B1 | 5/2005 | Schriebman | |
| 6,909,837 B1 | 6/2005 | Unger | |
| 6,973,256 B1 | 12/2005 | Dagtas | |
| 7,028,327 B1 | 4/2006 | Dougherty et al. | |
| 7,055,166 B1 | 5/2006 | Logan | |
| 7,103,908 B2 | 9/2006 | Tomsen | |
| 7,110,658 B1 | 9/2006 | Iggulden et al. | |
| 7,114,170 B2 | 9/2006 | Harris et al. | |
| 7,120,924 B1 | 10/2006 | Katcher et al. | |
| 7,140,033 B1 | 11/2006 | Durden et al. | |
| 7,155,451 B1 | 12/2006 | Torres | |
| 7,159,232 B1 | 1/2007 | Blackketter et al. | |
| 7,194,754 B2 | 3/2007 | Tomsen et al. | |
| 7,225,142 B1 | 5/2007 | Apte | |
| 7,269,330 B1 | 9/2007 | Iggulden | |
| 7,308,698 B1 | 12/2007 | Heughebaert et al. | |
| 7,313,802 B1 | 12/2007 | Tomsen | |
| 7,333,153 B2 | 2/2008 | Hartson et al. | |
| 7,373,651 B2 | 5/2008 | Palazzo et al. | |
| 7,395,546 B1 | 7/2008 | Asmussen | |
| 7,404,148 B2 | 7/2008 | Lincke et al. | |
| 7,421,729 B2 | 9/2008 | Zenoni | |
| 7,661,121 B2 | 2/2010 | Smith | |
| 7,681,141 B2 | 3/2010 | Tu | |
| 7,716,588 B2 | 5/2010 | Iwamura | |
| 7,743,326 B2 | 6/2010 | Kanai | |
| 7,752,642 B2 | 7/2010 | Lemmons | |
| 7,814,511 B2 | 10/2010 | Macrae et al. | |
| 7,818,763 B2 | 10/2010 | Sie et al. | |
| 7,877,766 B1 | 1/2011 | Wu et al. | |
| 7,886,337 B2 | 2/2011 | Williams et al. | |
| 7,889,964 B1 | 2/2011 | Barton et al. | |
| 8,046,803 B1 | 10/2011 | Lee | |
| 8,122,236 B2 | 2/2012 | Hayward | |
| 8,146,130 B2 | 3/2012 | Smith et al. | |
| 8,161,412 B2 | 4/2012 | Weeks et al. | |
| 8,296,792 B2 | 10/2012 | Sahota et al. | |
| 8,438,596 B2 | 5/2013 | Barton et al. | |
| 8,453,193 B2 | 5/2013 | Barton et al. | |
| 8,739,236 B1 | 5/2014 | Weaver et al. | |
| 8,893,180 B2 | 11/2014 | Barton et al. | |
| 9,106,881 B2 | 8/2015 | Barton et al. | |
| 9,264,686 B2 | 2/2016 | Barton et al. | |
| 2001/0016884 A1 | 8/2001 | Sato et al. | |
| 2001/0029583 A1 | 10/2001 | Palatov et al. | |
| 2001/0042246 A1 | 11/2001 | Yuen et al. | |
| 2002/0003949 A1 | 1/2002 | Mamiya et al. | |
| 2002/0013950 A1 | 1/2002 | Tomsen | |
| 2002/0016963 A1 * | 2/2002 | Inoue | H04N 5/44543 725/39 |
| 2002/0016965 A1 | 2/2002 | Tomsen et al. | |
| 2002/0048349 A1 | 4/2002 | Bixler et al. | |
| 2002/0054091 A1 | 5/2002 | Tomsen et al. | |
| 2002/0057893 A1 | 5/2002 | Wood et al. | |
| 2002/0073425 A1 * | 6/2002 | Arai | H04H 40/09 725/44 |
| 2002/0078456 A1 | 6/2002 | Hudson et al. | |
| 2002/0104086 A1 | 8/2002 | Tomsen et al. | |
| 2002/0120925 A1 | 8/2002 | Logan | |
| 2002/0124250 A1 | 9/2002 | Proehl et al. | |
| 2002/0144262 A1 | 10/2002 | Plotnick et al. | |
| 2002/0163532 A1 | 11/2002 | Thomas et al. | |
| 2002/0178368 A1 | 11/2002 | Yin et al. | |
| 2003/0005463 A1 * | 1/2003 | MacRae et al. | 725/112 |
| 2003/0014754 A1 | 1/2003 | Chang | |
| 2003/0053540 A1 | 3/2003 | Wang et al. | |
| 2003/0088872 A1 | 5/2003 | Maissel et al. | |
| 2003/0093790 A1 | 5/2003 | Logan et al. | |
| 2003/0122966 A1 | 7/2003 | Markman et al. | |
| 2003/0174549 A1 | 9/2003 | Yaguchi et al. | |
| 2003/0229893 A1 | 12/2003 | Sgaraglino | |
| 2004/0122746 A1 | 6/2004 | Charlier et al. | |
| 2004/0125761 A1 | 7/2004 | Yamaguchi et al. | |
| 2004/0187158 A1 | 9/2004 | Fellenstein et al. | |
| 2004/0210824 A1 | 10/2004 | Shoff et al. | |
| 2005/0022251 A1 | 1/2005 | Ohnuma et al. | |
| 2005/0055640 A1 | 3/2005 | Alten | |
| 2005/0086705 A1 | 4/2005 | Jarman et al. | |
| 2005/0226601 A1 | 10/2005 | Cohen et al. | |
| 2005/0278747 A1 | 12/2005 | Barton et al. | |
| 2006/0013556 A1 | 1/2006 | Poslinski | |
| 2006/0089843 A1 | 4/2006 | Flather | |
| 2006/0136980 A1 | 6/2006 | Fulcher et al. | |
| 2006/0184961 A1 | 8/2006 | Lee et al. | |
| 2007/0300249 A1 | 12/2007 | Smith et al. | |
| 2007/0300250 A1 | 12/2007 | Smith et al. | |
| 2008/0066127 A1 | 3/2008 | Schechinger et al. | |
| 2008/0104199 A1 | 5/2008 | Kalaboukis | |
| 2008/0212949 A1 | 9/2008 | Wachtfogel | |
| 2009/0241158 A1 | 9/2009 | Campagna et al. | |
| 2009/0320056 A1 | 12/2009 | Wu et al. | |
| 2010/0080529 A1 | 4/2010 | Barton et al. | |
| 2010/0280876 A1 | 11/2010 | Bowra | |
| 2011/0116766 A1 | 5/2011 | Sie et al. | |
| 2011/0126224 A1 | 5/2011 | Pan | |
| 2012/0114301 A1 | 5/2012 | Barton et al. | |
| 2012/0213494 A1 | 8/2012 | Barton et al. | |
| 2012/0284748 A1 | 11/2012 | Marler et al. | |
| 2013/0163954 A1 | 6/2013 | Barton et al. | |
| 2013/0243393 A1 | 9/2013 | Barton et al. | |
| 2013/0247092 A1 | 9/2013 | Barton et al. | |
| 2014/0056572 A1 | 2/2014 | Barton et al. | |
| 2014/0059593 A1 | 2/2014 | Smith et al. | |
| 2015/0074719 A1 | 3/2015 | Barton et al. | |

FOREIGN PATENT DOCUMENTS

| | | |
|---|---|---|
| EP | 0 784 400 | 7/1997 |
| EP | 081789 | 12/1997 |
| EP | 0817486 | 1/1998 |
| EP | 0933891 A2 | 8/1999 |
| JP | 362266787 A * | 11/1987 |
| JP | 02071633 | 3/1990 |
| JP | H02-71633 | 3/1990 |
| JP | 05114194 | 5/1993 |
| JP | 05182294 | 7/1993 |
| JP | 07212331 | 8/1995 |
| JP | H07-212331 | 8/1995 |
| JP | H8-205101 | 8/1996 |
| JP | H09-65267 | 3/1997 |
| JP | H9-107539 | 4/1997 |
| JP | 09135391 | 5/1997 |

(56) References Cited

FOREIGN PATENT DOCUMENTS

| | | | |
|---|---|---|---|
| JP | 410093936 A | * | 4/1998 |
| JP | H10-164521 | | 6/1998 |
| JP | 10208392 | | 8/1998 |
| JP | H10-208392 | | 8/1998 |
| JP | H11-103452 | | 4/1999 |
| JP | 11187324 | | 7/1999 |
| JP | H11-187324 | | 7/1999 |
| JP | H11-239333 | | 8/1999 |
| JP | 2000013755 | | 1/2000 |
| JP | 2001126009 | | 5/2001 |
| JP | 2001338242 | | 12/2001 |
| JP | 2006506883 | | 2/2006 |
| WO | WO 92/22983 | | 12/1992 |
| WO | WO 92/22983 A2 | | 12/1992 |
| WO | WO 98/07273 | | 2/1998 |
| WO | WO9811723 | | 3/1998 |
| WO | WO 98/17064 | * | 4/1998 |
| WO | WO98/17064 | | 4/1998 |
| WO | WO9817064 A1 | | 4/1998 |
| WO | WO 98/31149 | | 7/1998 |
| WO | WO 98/48566 | | 10/1998 |
| WO | WO9848566 A2 | | 10/1998 |
| WO | WO 99/17549 | * | 4/1999 |
| WO | WO 99/38321 | | 7/1999 |
| WO | WO 00/10327 A | | 2/2000 |
| WO | WO 01/22729 A1 | | 3/2001 |
| WO | WO 01/67756 A2 | | 9/2001 |
| WO | WO 2005/034503 A3 | | 4/2005 |
| WO | WO 2005/079499 | | 9/2005 |
| WO | WO 2007/144728 A2 | | 12/2007 |
| WO | WO2008/002309 A2 | | 1/2008 |
| WO | WO2008/054802 | | 5/2008 |
| WO | WO 2009/026411 A1 | | 2/2009 |

OTHER PUBLICATIONS

Japanese Current Claims of International Application No. 2011-253349 dated Aug. 2012 (4 pages).
Japan Patent Office, "Notification of Reasons for Rejection" in application No. 2012-504753 dated Mar. 15, 2013, 2 pages.
Current Claims in application No. 2012-504753 dated Mar. 2013, 6 pages.
Australian Patent Office, "Patent Examination Report" in application No. 2010234678 dated Apr. 4, 2013, 3 pages.
Current Claims in application No. 2010234678 dated Apr. 2013, 5 pages.
Official Action from EPO for foreign patent application No. 99 909867.6-2202, dated Dec. 2002 (5 pgs).
Current Claims in EPO patent application No. 99 909 867.6-2202 (9pgs).
Office Action from EPO for foreign patent application No. 0096677 5.9-2202 dated Apr. 20, 2007 (3 pgs).
Current claims in EPO patent application No. 00966775.9-2202 (14 pgs).
Claims, application No. PCTIUS04/32757, 10 pages.
International Searching Authority, "Notification of Transmittal of the International Search Report and the Written Opinion of the International Searching Authority, or the Declaration", dated May 11, 2007, 13 pages.
Office Action from EPO for foreign patent application No. 07021583.5, dated Feb. 7, 2008, (9 pgs).
Current claims of EPO patent application No. 07021583.5, (2 pgs).
Office Action from EPO for foreign patent application No. 07021582.7 dated Feb. 15, 2008, (9 pgs).
Current claims of EPO patent application No. 07021582.7, (4 pgs).
European Patent Office, "European Search Report", foreign application No. PCTIUS06/24688, dated Jul. 11, 2008, 11 pages.
Claims, foreign application No. PCTIUS06/24688, 13 pages.
European Office Action in application No. 07021582.7 dated Oct. 14, 2010 (7 pages).
Current Claims of European application No. 07021582.7, Dec. 2010 (4 pages).
European Patent Office, "Office Action", Application No. 07 021583.5-1241, Applicant: Tivo Inc., Dated May 2, 2011, 4 pages.
Claims, Application No. 07 021 583.5-1241, Applicant: Tivo Inc., Dated May 2011, 2 pages.
Intellectual Property of Singapore, "Examination Report", in application No. 201107098-4, dated Jan. 22, 2013, 12 pages.
Current Claims in Singapore application No. 201107098-4, dated Jan. 2013, 6 pages.
U.S. Appl. No. 13/027,078, filed Feb. 14, 2011, Office Action, Jul. 15, 2013.
U.S. Appl. No. 13/027,117, filed Feb. 14, 2011, Notice of Allowance, Jul. 3, 2013.
U.S. Appl. No. 13/253,913, filed Oct. 5, 2011, Office Action, Apr. 25, 2013.
U.S. Appl. No. 13/253,913, filed Oct. 5, 2011, Final Office Action, Sep. 24, 2013.
U.S. Appl. No. 13/027,078, filed Feb. 14, 2011, Notice of Allowance, Oct. 25, 2013.
U.S. Appl. No. 13/871,289, filed Apr. 26, 2013, Office Action, Oct. 28, 2013.
Canadian Intellectual Property Office, "Office Action", in U.S. Pat. No. 2,757,469, dated Oct. 1, 2013, 3 pages.
Current Claims in U.S. Pat. No. 2,757,469, dated Oct. 2013, 6 pages.
Japan Patent Office, "Reasons for Rejection" in U.S. Pat. No. 2012-504753 dated Oct. 15, 2013.
Current Claims in application No. 2012-504753, dated Oct. 2013, 6 pages.
European Patent Office, Search Report in application No. 10762268.0-1905, dated Feb. 18, 2014, 8 pages.
Current Claims in application No. 10762268.0-1905, dated Feb. 2014, 4 pages.
The State Intellectual Property Office of the People's Republic of China, "Notification of First Office Action" in application No. 201080025573.X, dated Dec. 24, 2013, 12 pages.
Current Claims in application No. 201080025573.X, dated Dec. 2013, 6 pages.
United States Patent and Trademark Office, U.S. Appl. No. 14/543,433, Non-Final Office Action dated Aug. 19, 2015.
United States Patent and Trademark Office, U.S. Appl. No. 13/867,932, Notice of Allowance dated Sep. 21, 2015.
European Patent Office, Application No. 10159416.6, Foreign Office Action dated Jul. 16, 2015.
European Patent Office, Application No. 10159416.6, Pending Claims as of Jul. 16, 2015.
United States Patent and Trademark Office, U.S. Appl. No. 13/867,932, Final Office Action dated Aug. 1, 2014.
United States Patent and Trademark Office, U.S. Appl. No. 13/459,995, Final Office Action dated Nov. 3, 2014.
U.S. Appl. No. 13/007,619, filed Jan. 15, 2011 Office Action, Mar. 28, 2013.
U.S. Appl. No. 13/021,625, filed Feb. 4, 2011 Final Office Action, Sep. 5, 2013.
U.S. Appl. No. 13/007,619, filed Jan. 15, 2011 Final Office Action, Oct. 10, 2013.
U.S. Appl. No. 13/021,625, filed Feb. 4, 2011 Final Office Action, Jan. 8, 2014.
U.S. Appl. No. 13/007,619, filed Jan. 15, 2011, Office Action, Mar. 10, 2014.
U.S. Appl. No. 13/093,689, filed Apr. 25, 2011, Office Action, May 30, 2014.
United States Patent and Trademark Office, U.S. Appl. No. 13/093,689, Non-Final Office Action dated May 30, 2014.
United States Patent and Trademark Office, U.S. Appl. No. 13/021,625, Final Office Action dated Aug. 11, 2014.
U.S. Appl. No. 12/539,505 Office Action, Aug. 20, 2012.
U.S. Appl. No. 12/539,505, filed Aug. 11, 2009 Final Office Action, Dec. 3, 2012.
U.S. Appl. No. 12/539,505Final Office Action dated Dec. 3, 2012.
U.S. Appl. No. 10/958,897, filed Oct. 4, 2012, Office Action, Mar. 5, 2013.
U.S. Appl. No. 12/539,505, filed Aug. 11, 2009, Office Action, Apr. 9, 2013.

(56) References Cited

OTHER PUBLICATIONS

U.S. Appl. No. 12/539,505, filed Aug. 11, 2009, Notice of Allowance, Sep. 10, 2013.
U.S. Appl. No. 10/958,897 Advisory Action, Nov. 6, 2013.
U.S. Appl. No. 10/958,897, filed Oct. 4, 2004 Office Action, Jan. 7, 2014.
U.S. Appl. No. 12/572,037, filed Oct. 1, 2009 Office Action, Sep. 13, 2012.
U.S. Appl. No. 12/572,037, filed Oct. 1, 2009 Final Office Action, Jan. 11, 2013.
U.S. Appl. No. 12/572,037, filed Oct. 1, 2009, dated Jun. 21, 2013.
U.S. Appl. No. 11/726,054, filed Mar. 20, 2007 Final Office Action, Dec. 5, 2012.
U.S. Appl. No. 11/726,054, filed Mar. 20, 2007, Non-Final Office Action mailed Jun. 20, 2013.
U.S. Appl. No. 13/771,067, filed Feb. 19, 2013, Non-Final OA mailed Jul. 25, 2013.
U.S. Appl. No. 13/771,067, filed Feb. 19, 2013, Office Action mailed Jul. 25, 2013.
U.S. Appl. No. 13/771,067, filed Feb. 19, 2013, Final Office Action, Apr. 16, 2014.
United States Patent and Trademark Office, U.S. Appl. No. 11/726,054, Final Office Action dated Apr. 29, 2014.
U.S. Appl. No. 11/725,909, filed Mar. 19, 2007 Final Office Action, Nov. 8, 2012.
U.S. Appl. No. 11/725,909, filed Mar. 19, 2007, Non-Final OA mailed Jul. 15, 2013.
U.S. Appl. No. 11/725,909, filed Mar. 19, 2007, Final Office Action, Mar. 26, 2014.
United States Patent and Trademark Office, U.S. Appl. No. 14/072,678, Non-Final Office Action dated Dec. 12, 2014.
United States Patent and Trademark Office, U.S. Appl. No. 13/459,995, Advisory Action dated Feb. 20, 2015.
United States Patent and Trademark Office, U.S. Appl. No. 13/867,932, Non-Final Office Action dated Mar. 25, 2015.
United States Patent and Trademark Office, U.S. Appl. No. 13/459,995, Notice of Allowance dated Mar. 30, 2015.
United States Patent and Trademark Office, U.S. Appl. No. 14/072,678, Notice of Allowance dated Jul. 21, 2015.
Japanese Patent Office, Application No. 2013-156103, Foreign Office Action dated Jul. 8, 2014.
Japanese Patent Office, Application No. 2013-156103, Pending Claims as of Jul. 8, 2014.
Japanese Patent Office, Application No. 2014-004254, Foreign Office Action dated Jul. 24, 2014.
Japanese Patent Office, Application No. 2014-004254, Pending Claims as of Jul. 24, 2014.
Japanese Patent Office, Application No. 2012-504753, Foreign Office Action dated Oct. 21, 2014.
Japanese Patent Office, Application No. 2012-504753, Pending Claims as of Oct. 31, 2014.
Chinese Patent Office, Application No. 200480033609.3, Office Action dated Oct. 9, 2013, 13 pages.
Chinese Patent Office, Application No. 200480033609.3, Claims dated Oct. 2013, 4 pages.
Chinese Patent Office, Application No. 200480033609.3, "Notification of the Fifth Office Action" in application No., dated Apr. 30, 2014, 15 pages.
Chinese Patent Office, Application No. 200480033609.3, Claims dated Apr. 2014, 4 pages.
European Patent Office, "Search Report" in application No. 11 195 319.6-1908, dated Mar. 21, 2014, 7 pages.
European Patent Office, Current Claims in application No. 11 195 319.6-1908, dated Mar. 2014, 2 pages.
Japanese Patent Office, Application No. 2010-101051, Claims dated Nov. 2013.
Japanese Patent Office, Application No. 2010-101051, Pending Claims dated May 21, 2013, 3 pages.
Japanese Patent Office, Application No. 2010-101051, Decision of Rejection dated Jan. 14, 2014, 4 pages.
Japanese Patent Office, Application No. 2010-101051, , Pending Claims dated Jan. 2, 2011, 3 pages.
Chinese Patent Office, Application No. 201080025573.X, Foreign Office Action dated Dec. 5, 2014.
Chinese Patent Office, Application No. 201080025573.X, Pending Claims as of Dec. 5, 2014.
Japanese Patent Office, Application No. 2011-253349, Appeal Decision dated Feb. 10, 2015.
Japanese Patent Office, Application No. 2011-253349, Pending Claims as of Feb. 10, 2015.
Japanese Patent Office, Application No. 2014-004254, Foreign Office Action dated Feb. 3, 2015.
Japanese Patent Office, Application No. 2014-004254, Pending Claims as of Feb. 3, 2015.
Japanese Patent Office, Application No. 2013-156103, Foreign Office Action dated Feb. 3, 2015.
Japanese Patent Office, Application No. 2013-156103, Pending Claims as of Feb. 3, 2015.
European Patent Office, Application No. 10153517.7, Summons to Oral Proceedings dated Jun. 5, 2015.
European Patent Office, Application No. 10153517.7, Pending Claims as of Jun. 5, 2015.
United States Patent and Trademark Office, U.S. Appl. No. 14/072,678, Notice of Allowance dated Nov. 25, 2015.
United States Patent and Trademark Office, U.S. Appl. No. 14/543,433, Final Office Action dated Nov. 30, 2015.
European Patent Office, Application No. 07021582.7, Pending Claims as of Oct. 22, 2015.
European Patent Office, Application No. 07021582.7, Summons to Oral Proceedings dated Oct. 22, 2015.

* cited by examiner

ONE-TOUCH RECORDING OF A PROGRAM BEING ADVERTISED

CROSS-REFERENCE TO RELATED APPLICATIONS; PRIORITY CLAIM

This application claims benefit as a Continuation of U.S. Non-Provisional application Ser. No. 12/572,023 filed Oct. 1, 2009, which claims benefit as a continuation of U.S. application Ser. No. 11/182,135 filed Jul. 14, 2005, which claims benefit as a Divisional of U.S. application Ser. No. 09/665,921 filed Sep. 20, 2000, which claims benefit of Provisional U.S. Application 60/154,713, filed Sep. 20, 1999, and which is also a Continuation-In-Part of U.S. application Ser. No. 09/126,071 filed Jul. 30, 1998, the entire contents of all of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The invention relates to the processing of multimedia audio and video streams. More particularly, the invention relates to the tagging of multimedia audio and video television streams.

BACKGROUND

The Video Cassette Recorder (VCR) has changed the lives of television (TV) viewers throughout the world. The VCR has offered viewers the flexibility to time-shift TV programs to match their lifestyles.

The viewer stores TV programs onto magnetic tape using the VCR. The VCR gives the viewer the ability to play, rewind, fast forward and pause the stored program material. These functions enable the viewer to pause the program playback whenever he desires, fast forward through unwanted program material or commercials, and to replay favorite scenes. However, a VCR cannot both capture and play back information at the same time.

Digital Video Recorders (DVR) have recently entered into the marketplace. DVRs allow the viewer to store TV programs on a hard disk. This has freed the viewer from the magnetic tape realm. Viewers can pause, rewind, and fast forward live broadcast programs. However, the functionality of DVRs extends beyond recording programs.

Having programs stored locally in a digital form gives the programmer many more options than were previously available. Advertisements (commercials) can now be dynamically replaced and specifically targeted to the particular viewer based on his or her viewing habits. The commercials can be stored locally on the viewer's DVR and shown at any time.

DVRs allow interactive programming with the viewer. Generally, promotions for future shows are displayed to viewers during the normal broadcast programs. Viewers must then remember the date, time, and channel that the program will be aired on to record or view the program. DVRs allow the viewer to schedule the recording of the program immediately.

The only drawback is that the current generation of DVRs do not have the capability to interact with the viewer at this level. There is no means by which to notify the DVR that commercials are directly tied to a certain program or other advertisements. Further, there is no way to tell the DVR that a commercial can be replaced.

It would be advantageous to provide a closed caption tagging system that gives the content provider the ability to send frame specific data across broadcast media. It would further be advantageous to provide a closed caption tagging system that allows the receiver to dynamically interact with the viewer and configure itself based on program content.

SUMMARY

The invention provides a closed caption tagging system. The invention allows content providers to send frame specific data and commands integrated into video and audio television streams across broadcast media. In addition, the invention allows the receiver to dynamically interact with the viewer and configure itself based on video and audio stream content.

A preferred embodiment of the invention provides a mechanism for inserting tags into an audio or video television broadcast stream. Tags are inserted into the broadcast stream prior to or at the time of transmission. The tags contain command and control information that the receiver translates and acts upon.

The receiver receives the broadcast stream and detects and processes the tags within the broadcast stream. The broadcast stream is stored on a storage device that resides on the receiver. Program material from the broadcast stream is played back to the viewer from the storage device.

During the tag processing stage, the receiver performs the appropriate actions in response to the tags. The tags offer a great amount of flexibility to the content provider or system administrator to create a limitless amount of operations.

Tags indicate the start and end points of a program segment. The receiver skips over a program segment during playback in response to the viewer pressing a button on a remote input device. The receiver also automatically skips over program segments depending on the viewer's preferences.

Program segments such as commercials are automatically replaced by the receiver with new program segments. New program segments are selected based on various criteria such as the locale, time of day, program material, viewer's viewing habits, viewer's program preferences, or the viewer's personal information. The new program segments are stored remotely or locally on the receiver.

Menus, icons, and Web pages are displayed to the viewer based on information included in a tag. The viewer interacts with the menu, icon, or Web page through an input device. The receiver performs the actions associated with the menu, icon, or Web page and the viewer's input. If a menu or action requires that the viewer exit from the playback of the program material, then the receiver saves the exit point and returns the viewer back to the same exit point when the viewer has completed the interaction session.

Menus and icons are used to generate leads, generate sales, and schedule the recording of programs. A one-touch recording option is provided. An icon is displayed to the viewer telling the viewer that an advertised program is available for recording at a future time. The viewer presses a single button on an input device causing the receiver to schedule the program for recording. The receiver will also record the current program in the broadcast stream onto the storage device based on information included in a tag.

Tags are used to create indexes in program material. This allows the viewer to jump to particular indexes in a program.

Other aspects and advantages of the invention will become apparent from the following detailed description in combination with the accompanying drawings, illustrating, by way of example, the principles of the invention.

DETAILED DESCRIPTION

The invention is embodied in a closed caption tagging system. A system according to the invention allows content providers to send frame specific data and commands integrated into video and audio television streams across broadcast media. The invention additionally allows the receiver to dynamically interact with the viewer and configure itself based on video and audio stream content.

A preferred embodiment of the invention provides a tagging and interpretation system that allows a content provider to tag, in a frame specific manner, video and audio streams transmitted over television broadcast media. A receiver interprets and acts upon the tags embedded in the received stream. The tag data allow the receiver to dynamically interact with the viewer through menus and action icons. The tags also provide for the dynamic configuration of the receiver.

Figure 1:
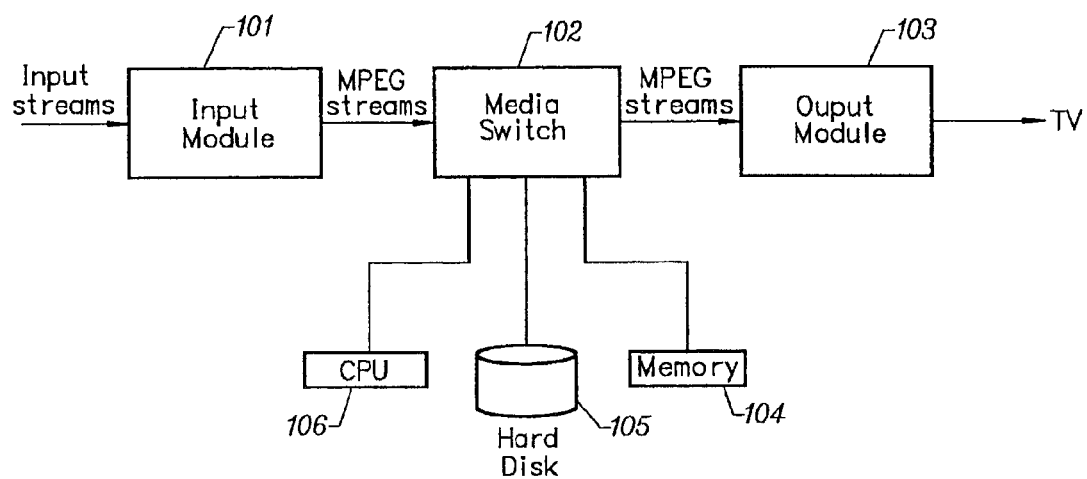
FIG. 1 is a block schematic diagram of a high level view of a preferred embodiment of the invention according to the invention.

Referring to FIG. 1, a preferred embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other sections as if they were delivered via an MPEG2 private data channel.

The Media Switch 102 mediates between a microprocessor CPU 106, hard disk or storage device 105, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 contains an MPEG decoder, On-Screen Display (OSD) generator, analog TV encoder and audio logic. The OSD generator allows the program logic to supply images which will be overlayed on top of the resulting analog TV signal. Additionally, the Output Section can modulate information supplied by the program logic onto the VBI of the output signal in a number of standard formats, including NABTS, CC and EDS.

Figure 2:
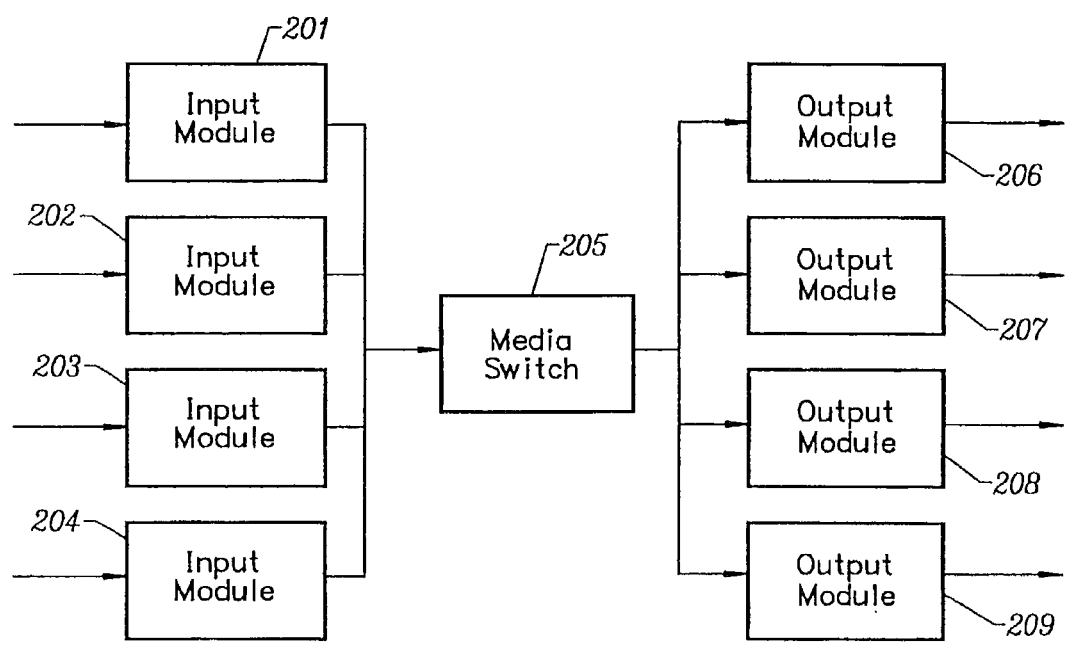
FIG. 2 is a block schematic diagram of a preferred embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
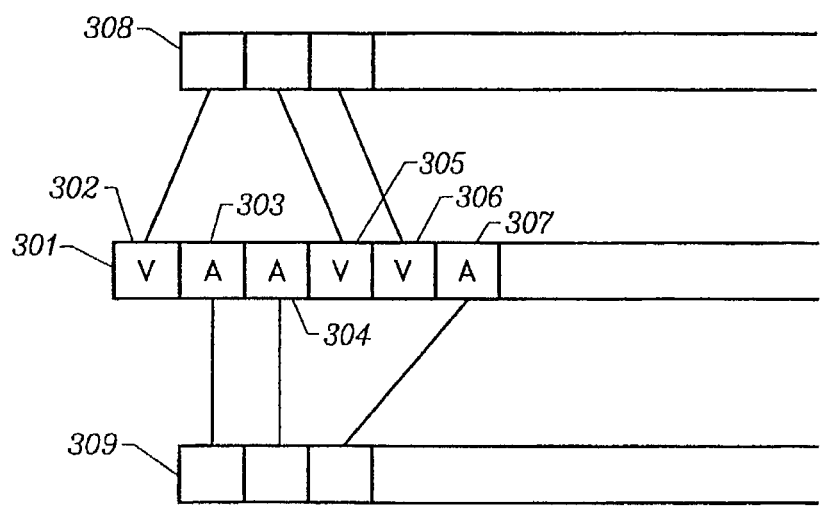
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform timestamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
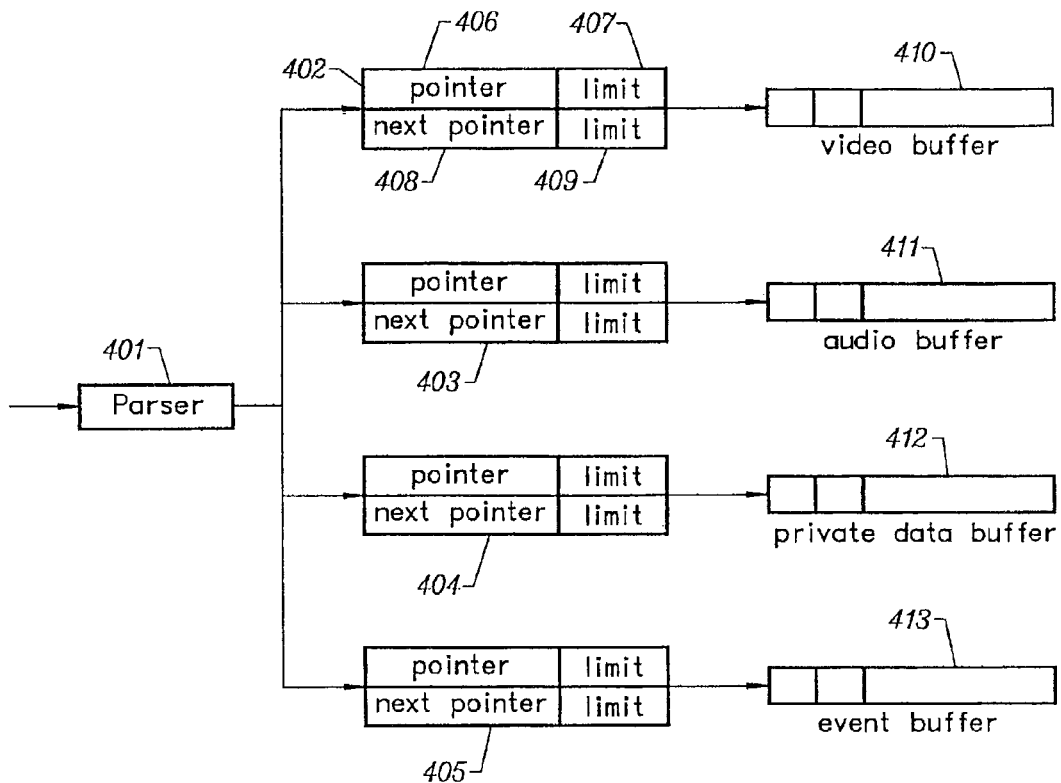
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
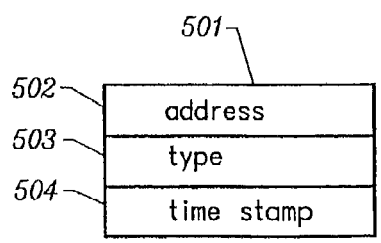
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
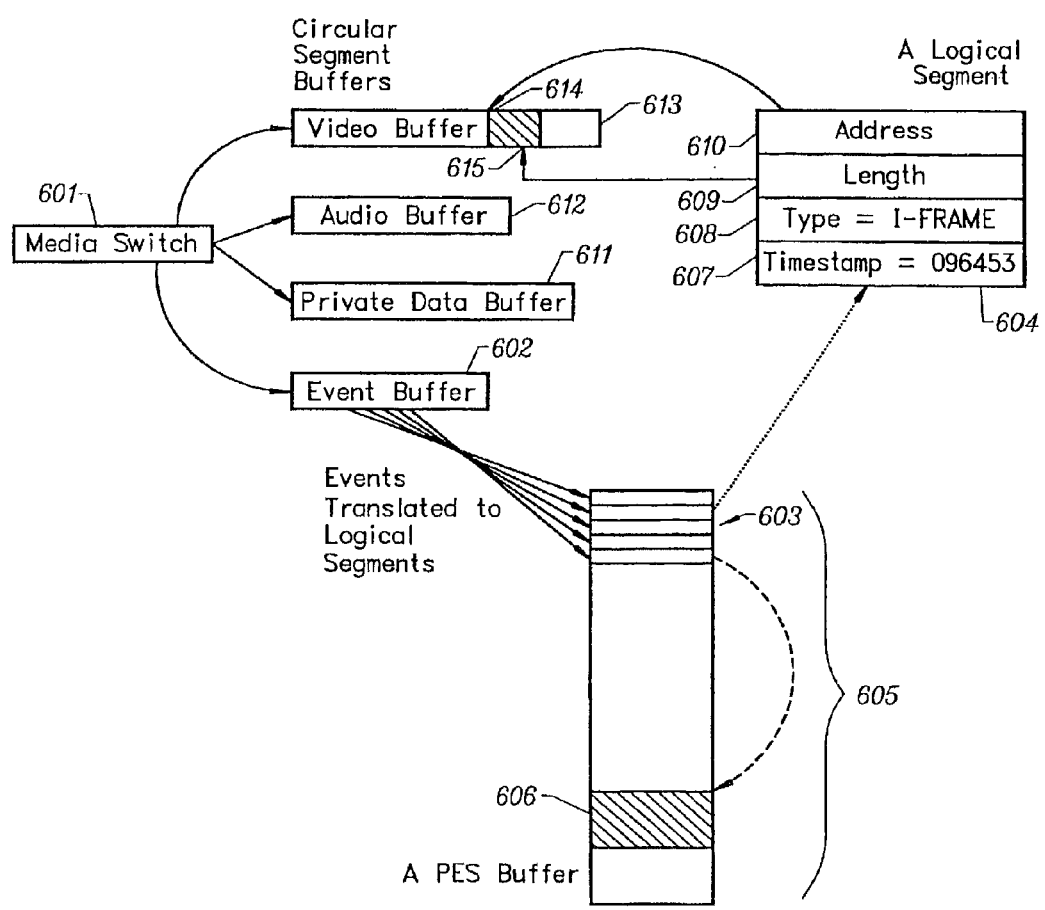
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment timestamp 607. In the case of a digital TV stream, PTS values are already encoded in the stream. The program logic extracts this information and places it in the logical segment timestamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk, and extracting video and audio data from the disk on a low cost platform. Generally, the Media Switch runs asynchronously and autonomously with the microprocessor CPU, using its DMA capabilities to move large quantities of information with minimal intervention by the CPU.

Figure 7:
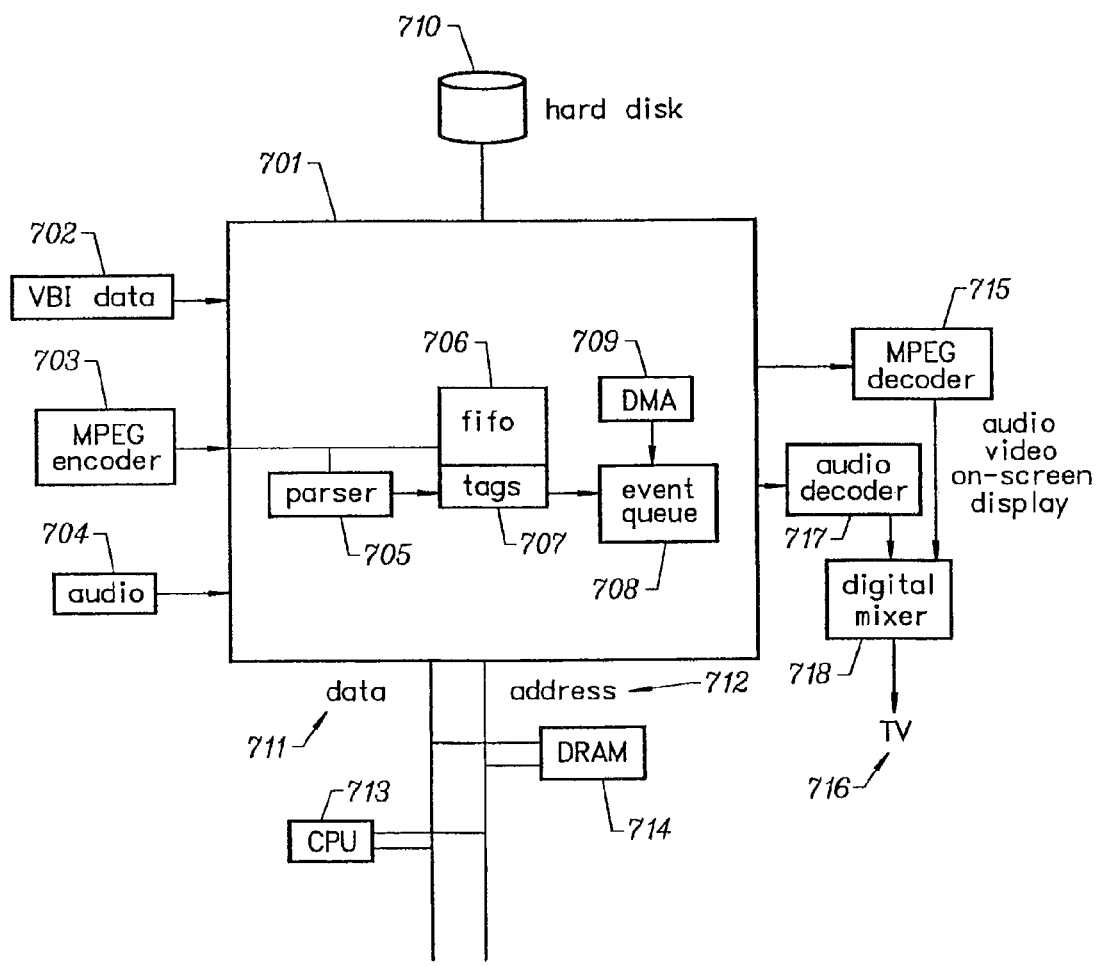
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence headers—all of the pieces of information that the program logic needs to know about in order to both properly play back and perform special effects on the stream, e.g. fast forward, reverse, play, pause, fast/slow play, indexing, and fast/slow reverse play.

The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on-screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower clock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal; however, sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

Figure 8:
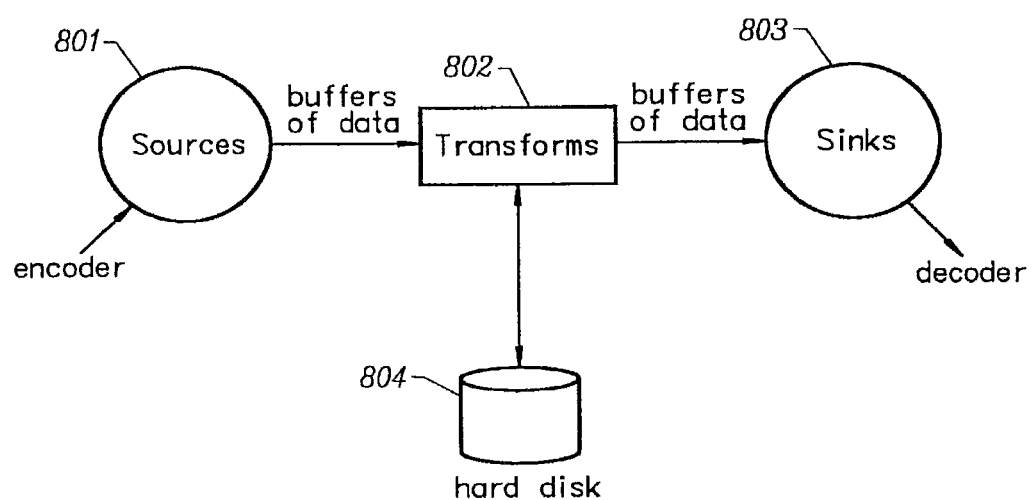
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

Figure 9:
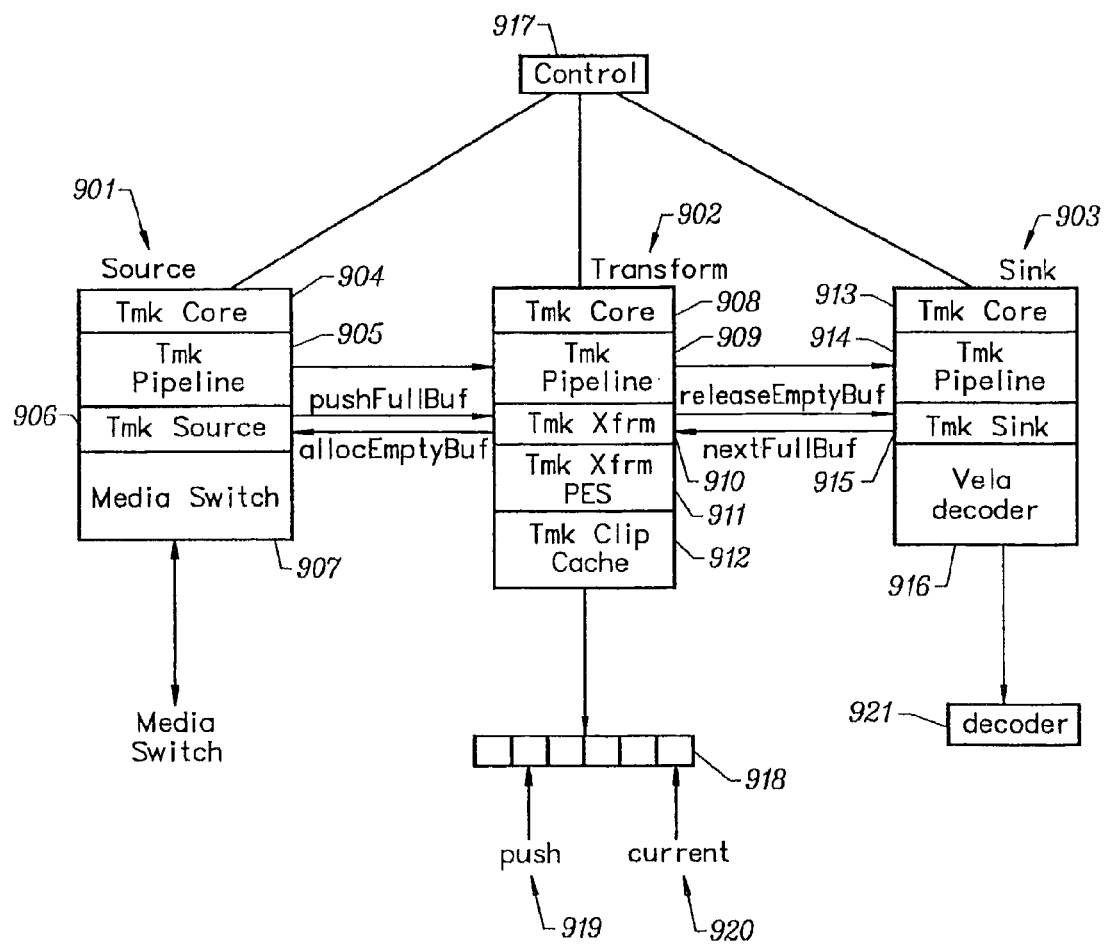
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXfrm 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it. It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902, that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
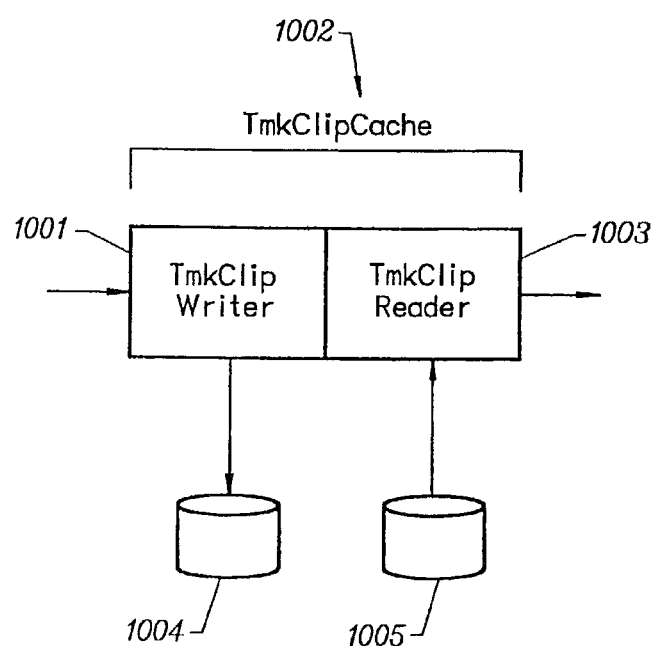
FIG. 10 is a block schematic diagram of a preferred embodiment of the clip cache component of the invention according to the invention.

With respect to FIG. 10, two other objects derived from the TmkXfrm class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
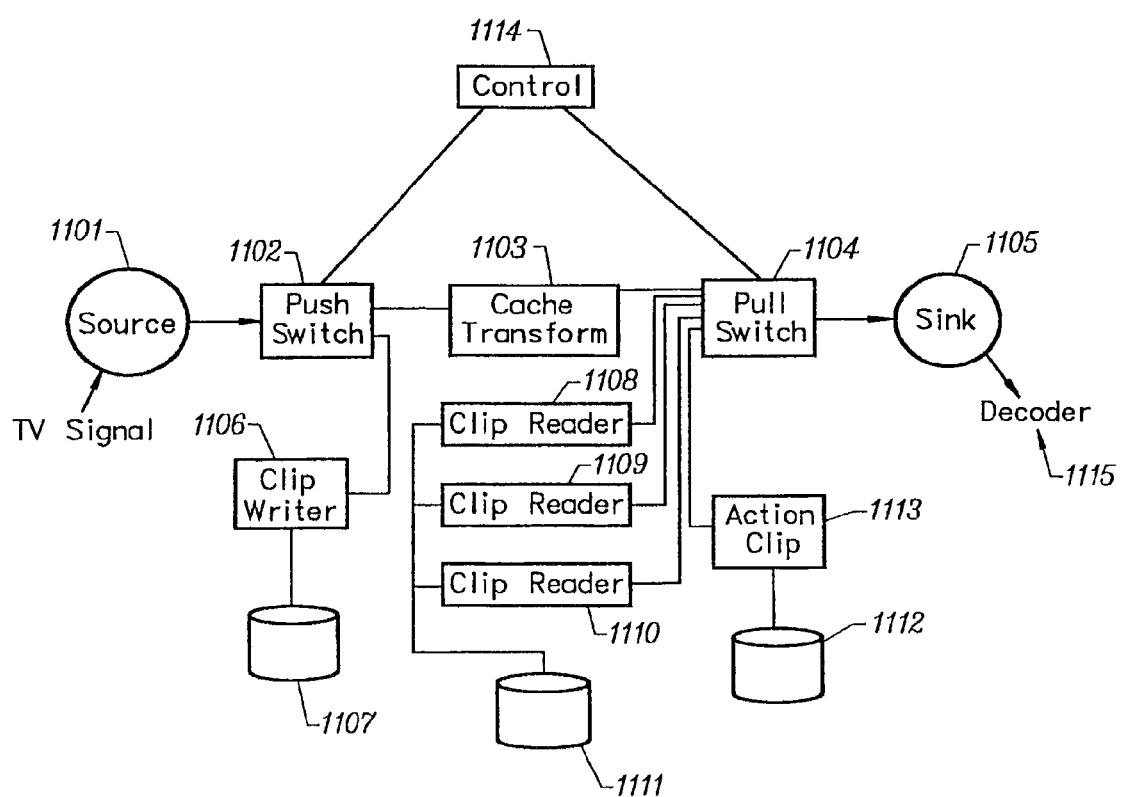
FIG. 11 is a block schematic diagram of a preferred embodiment of the invention that emulates a broadcast studio video mixer according to the invention.

Referring to FIG. 11, a preferred embodiment that accomplishes multiple functions is shown. A source 1101 has a TV signal input. The source sends data to a PushSwitch 1102 which is a transform derived from TmkXfrm. The PushSwitch 1102 has multiple outputs that can be switched by the control object 1114. This means that one part of the pipeline can be stopped and another can be started at the user's whim. The user can switch to different storage devices. The PushSwitch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time. This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
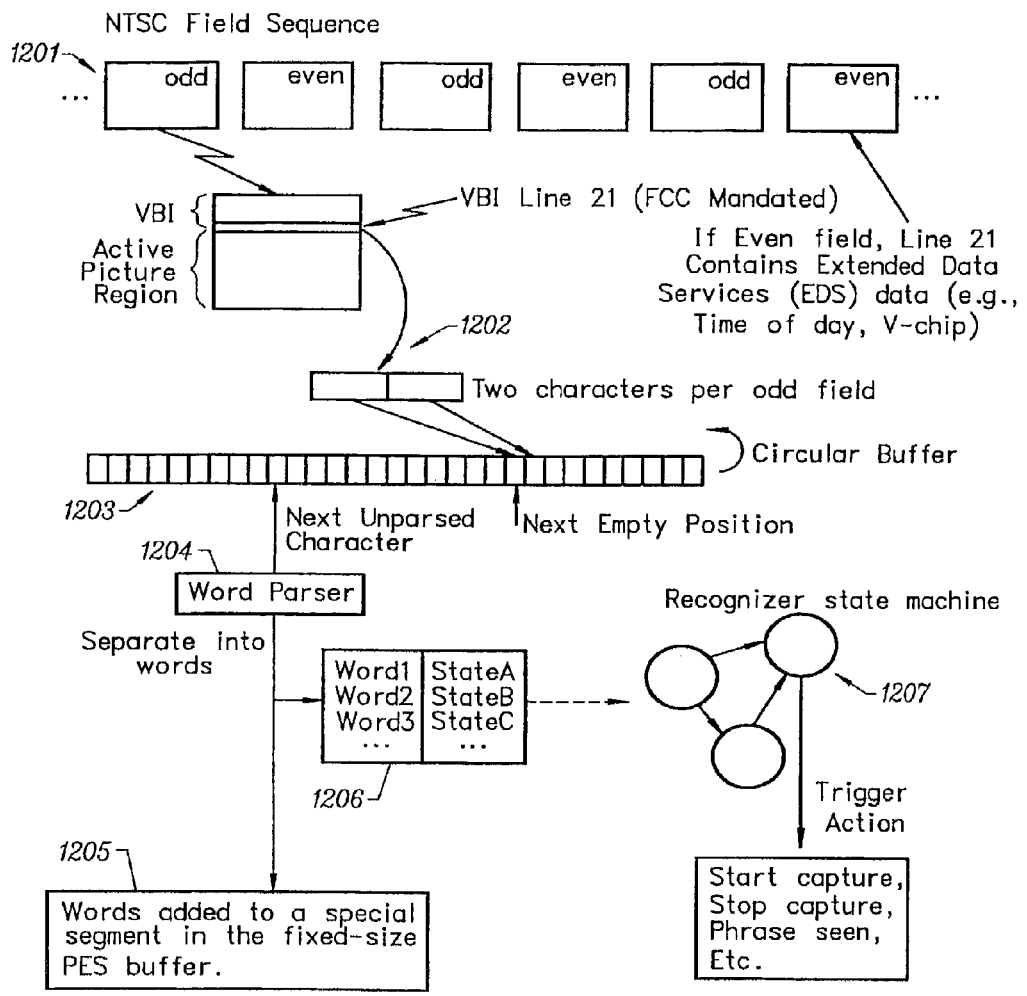
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105. The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkXfrm object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
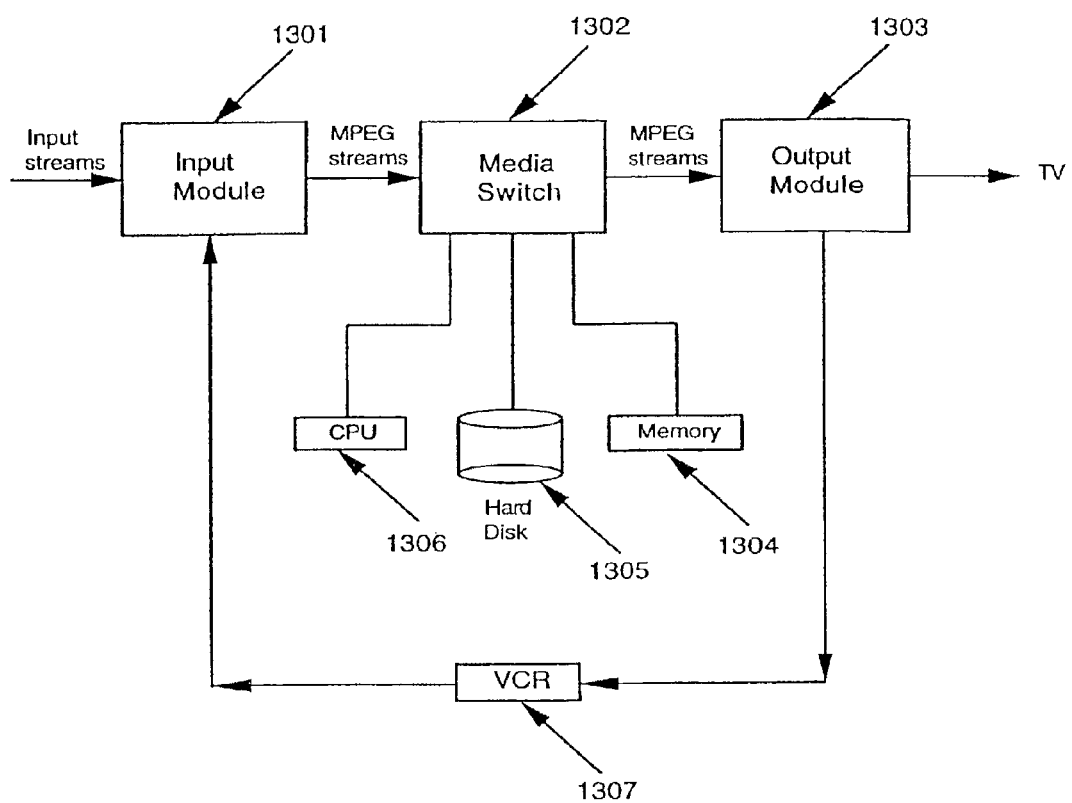
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

Such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, although a VCR is specifically mentioned above, any multimedia recording device (e.g., a Digital Video Disk-Random Access Memory (DVD-RAM) recorder) is easily substituted in its place.

Although the invention is described herein with reference to the preferred embodiment, other applications may be substituted for those set forth herein without departing from the spirit and scope of the present invention. For example, the invention can be used in the detection of gambling casino crime. The input section of the invention is connected to the casino's video surveillance system. Recorded video is cached and simultaneously output to external VCRs. The user can switch to any video feed and examine (i.e., rewind, play, slow play, fast forward, etc.) a specific segment of the recorded video while the external VCRs are being loaded with the real-time input video.

Video Stream Tag Architecture

Referring again to FIG. 12, tags are abstract events which occur in a television stream 1201. They may be embedded in the VBI of an analog signal, or in a private data channel in an MPEG2 multiplex. As described above, tags can be embedded in the closed caption (CC) fields and extracted into a circular buffer 1203 or memory allocation schema. The word parser 1204 identifies unique tags during its scan of the CC data. Tags are interspersed with the standard CC control codes. Tags may also be generated implicitly, for instance, based on the current time and program being viewed.

Figure 14:
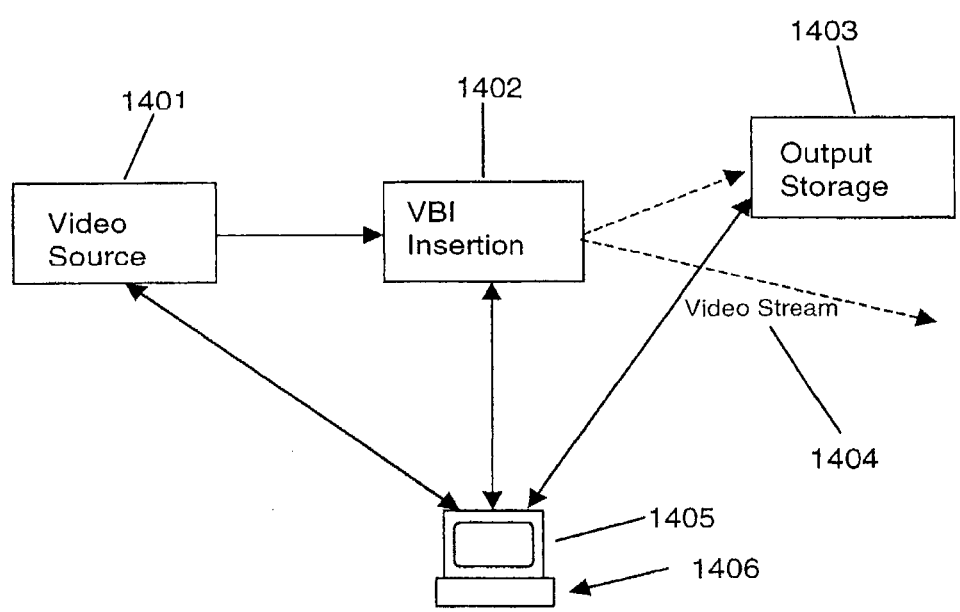
FIG. 14 is a block schematic diagram of a preferred embodiment of the invention for inserting tags into a video stream according to the invention.
Figure 16:
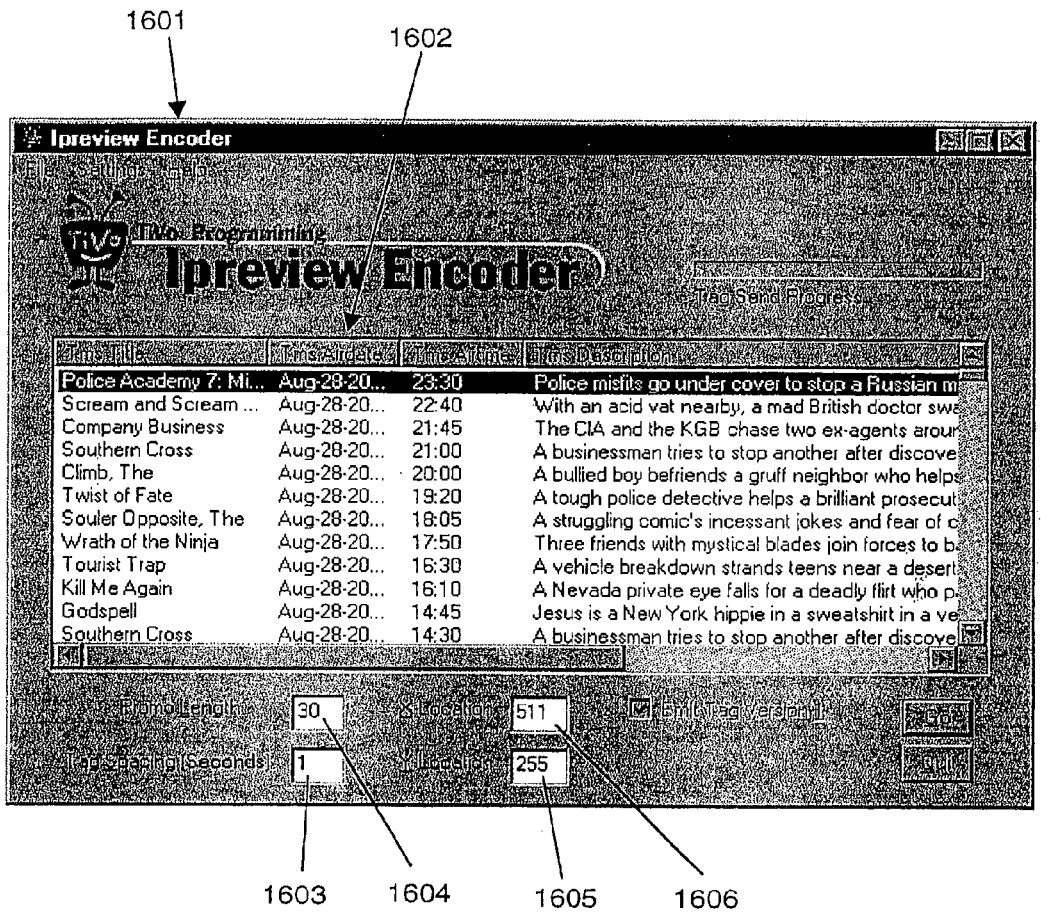
FIG. 16 is a diagram of a user interface for inserting tags into a video stream according to the invention.

The invention provides a mechanism called the TiVo Video Tag Authoring (TVTAG) system for inserting tags (TiVo tags) into a video stream prior to broadcast. With respect to FIGS. 14, 16, and 17, the TVTAG system consists of a video output source 1401, a compatible device for inserting Vertical Blanking Interval (VBI) closed-captioning information and outputting captioned video 1402, a video monitor 1405, and a software program for controlling the VBI insertion device to incorporate tag data objects in the form of closed-caption information in the video stream 1406. The tagged video is retransmitted immediately 1404 or stored on a suitable medium 1403 for later transmission.

The TVTAG software 1406, in its most basic implementation, is responsible for controlling the VBI Insertion device 1402. The TVTAG software 1406 communicates with the VBI insertion device 1402 by means of standard computer interfaces and device control code protocols. When an operator observing the video monitor 1405 determines that the desired tag insertion point has been reached, he presses a key, causing the TiVo tag data object to be generated, transmitted to the VBI insertion device 1402, and incorporated in the video stream for transmission 1404 or storage 1403.

The TVTAG software has the additional capability of controlling the video input source 1401 and the video output storage device 1403. The operator selects the particular video 1602 and has the ability to pause the video input stream to facilitate overlaying a graphic element 1702 on the monitor, and positioning it by means of a pointing device, such as a mouse. The positioning of the graphic element 1702 is also accomplished through the operator interface 1601. The operator inputs the position of the graphic using the X position 1605 and the Y position 1604.

The graphic element and positioning information are then incorporated in the TiVo tag data object (discussed below) and the time-code or frame of the video noted. When the operator is satisfied, playback and record are resumed. The tag is then issued through the insertion device with the highest degree of accuracy.

Figure 15:
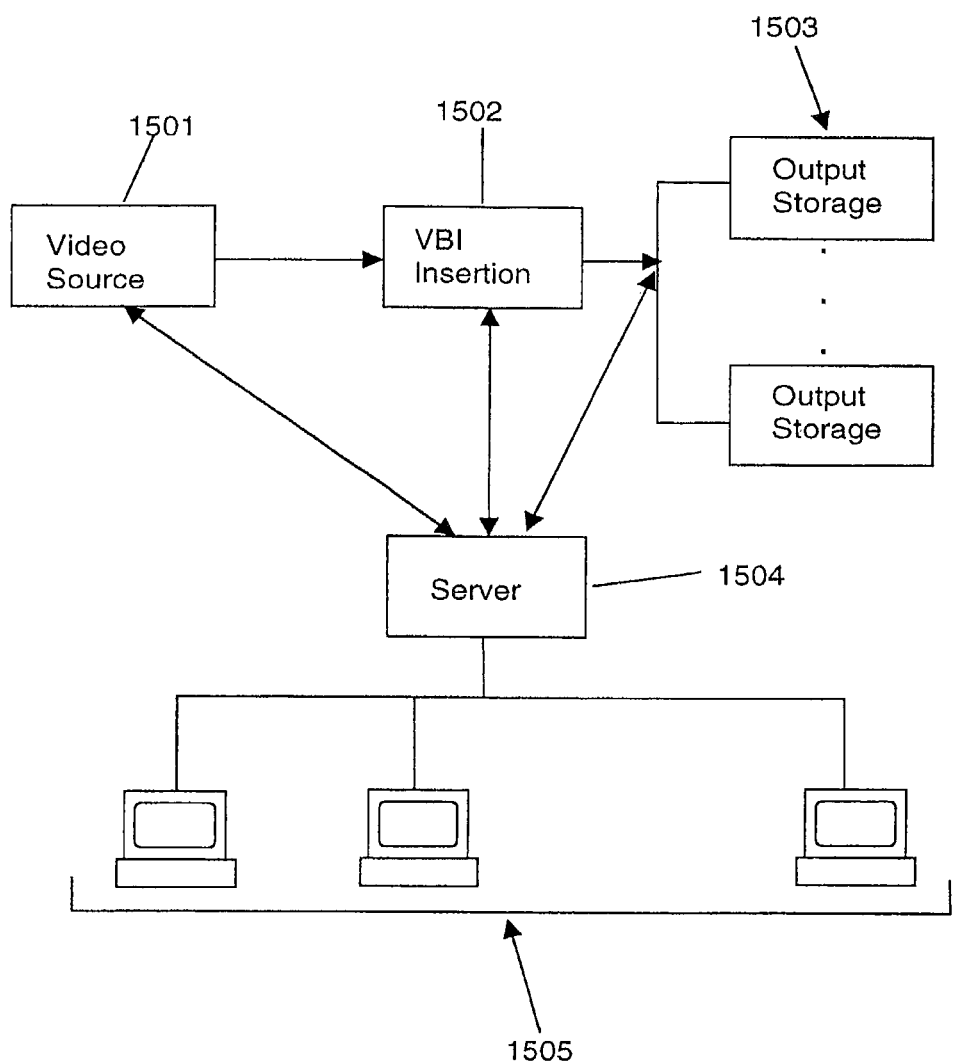
FIG. 15 is a block schematic diagram of a server-based preferred embodiment of the invention for inserting tags into a video stream according to the invention.

Referring to FIG. 15, in another embodiment of the TVTAG system, the software program takes the form of a standard Internet protocol Web page displayed to operator(s) 1505. The Web page causes the TiVo tag object to be generated by a script running on a remote server 1504. The server 1504 controls the VBI insertion device 1502, the video source 1501, and recording devices 1503. The remote operator(s) 1505 can receive from the server 1504 a low or high-bandwidth version of the video stream for use as a reference for tag insertion. Once the necessary tag data object information has been generated and transmitted, it can be batch-processed at a later time by the server 1504.

Another embodiment of the invention integrates the software with popular non-linear video editing systems as a "plug-in", thereby allowing the TiVo tag data objects to be inserted during the video production process. In this embodiment, the non-linear editing system serves as the source and storage system controller and also provides graphic placement facilities, allowing frame-accurate placement of the TiVo tag data object.

Figure 18:
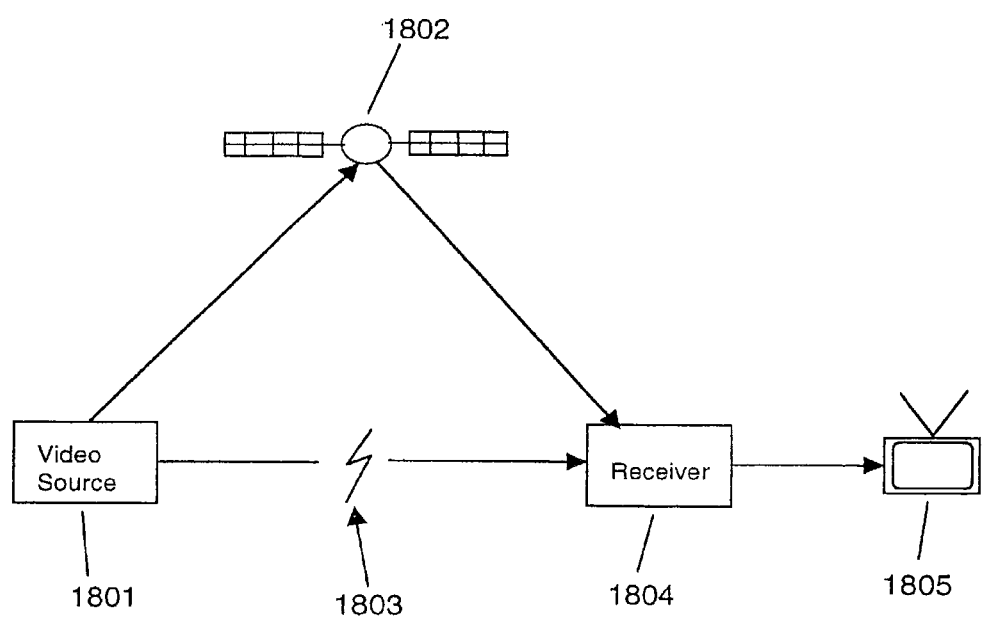
FIG. 18 is a block schematic diagram of the transmission route of a video stream according to the invention.

With respect to FIG. 18, tags are integrated into the video stream before or at the video source 1801. The video stream is then transmitted via satellite 1802, cable or other terrestrial transmission method 1803. The receiver 1804 receives the video stream, recognizes the tags and performs the appropriate actions in response to the tags. The viewer sees the resultant video stream via the monitor or television set 1805.

The invention provides an architecture that supports taking various actions based on tags in the video stream. Some examples of the flexibility that TiVo tags offer are:

It is desirable to know when a network promotion is being viewed so that the viewer might be presented with an option to record the program at some future time. TiVo tags are added into the promotion that indicate the date, time, and channel when the program airs. Active promos are described in further detail below.

A common problem is the baseball game overrun problem. VCRs and Digital Video Recorders (DVR) cut off the end of the baseball game whenever the game runs over the advertised time slot. A TiVo tag is sent in the video stream indicating that the recording needs to continue. A TiVo tag is also sent telling the system to stop the recording because the game has ended.

Boxing matches often end abruptly, causing VCRs and DVRs to record fill-in programs for the rest of the reserved time period. A TiVo tag is sent to indicate that the program has ended, telling the system to stop the recording.

Figure 19:
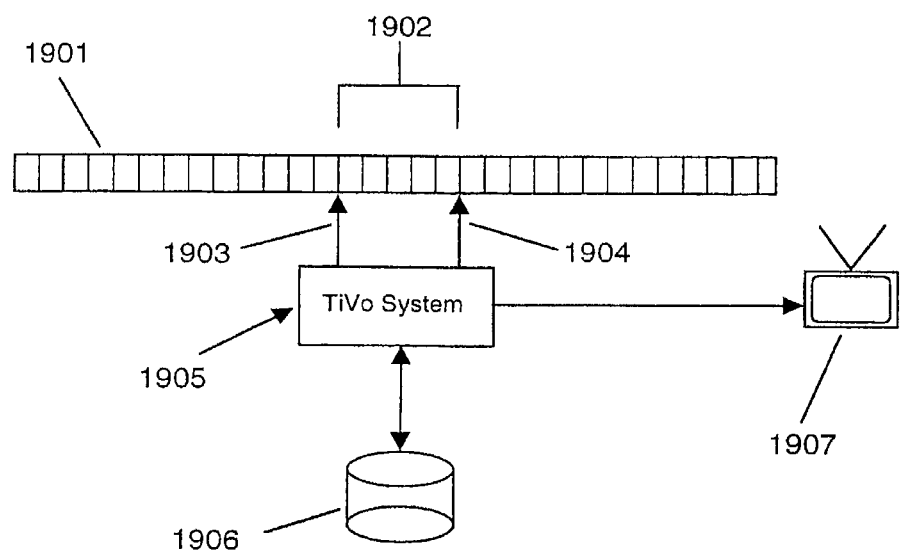
FIG. 19 is a block schematic diagram of the tagging of the start and end of a program segment of a video stream and the playback of a new program segment according to the invention.

Referring to FIG. 19, advertisements are tagged so a locally or remotely stored advertisement might be shown instead of a national or out of the area advertisement. Within the video stream 1901, the program segment 1902 (commercial or other program segment) to be overlaid is tagged using techniques such as the TVTAG system described above. The TiVo tags tell the invention 1905 the start and end points of the old program segment 1902. A single tag 1903 can be added that tells the invention 1905 the duration of the old program segment 1902 or a tag is added at the beginning 1903 and end 1904 of the old program segment to indicate the start and end of the segment 1902. When the TiVo tag is detected, the invention 1905 finds the new program segment 1906 and simply plays it back in place of the old program segment 1902, reverting to the original program 1901 when playback is completed. The viewer 1907 never notices the transition.

There are three options at this point:
1) The system 1905 can continue to cache the original program, so if the viewer 1907 rewinds the program 1901 and plays it again, he sees the overlaid segment;
2) The old program segment 1902 is replaced in the cache too, so the viewer never sees the overlaid segment; or
3) The system caches the original segment 1902 and reinterprets the tags on playback. However, without intelligent tag prefetching, this only works correctly if the viewer backs up far enough so the system sees the first tag in the overlaid segment.
   This problem is solved by adding the length of the old program segment to the start 1903 and end 1904 tag. Another approach is to match tags so that the start tag 1903 identifies the end tag 1904 to the system. The system 1905 knows that it should be looking for another tag when it fast forwards or rewinds over one of the tags. The pair of tags 1903, 1904 include a unique identifier. The system 1905 can then search ahead or behind for the matching tag and replace the old program. There is a limit to the amount of time or length of frames that the system can conduct the prefetch. This can be included in the tag or standardized. Including the limit in the tag is the most flexible approach.

The program segment to be played back is selected based, for example, on locale, the time of day, program material, or on the preference engine (described in application Ser. No. 09/422,121 owned by the Applicant). Using the preference engine, the appropriate program segment from local or server storage 1906 is selected according to the viewer's profile. The profile contains the viewer's viewing habits, program preferences, and other personal information. The stored program segments 1906 have program objects describing their features as well, which are searched for best match versus the preference vector.

Clearly, there must be a rotation mechanism among commercials to avoid ad burnout. The preference vector can be further biased by generating an error vector versus the program data for the currently viewed program, and using this error vector to bias the match against the commercial inventory on disk 1906. For example, if the viewer is watching a soap opera and the viewer's preference vector is oriented towards sports shows, then the invention will select the beer commercial in favor of the diaper commercial.

A tag can also be used to make conditional choices. The tag contains a preference weighting of its own. In this case, the preference weighting is compared to the preference vector and a high correlation causes the invention to leave the commercial alone. A low correlation invokes the method above.

NOTE: In all of these cases the system 1905 has more than enough time to make a decision. The structure of the pipeline routinely buffers ½ second of video, giving lots of time between input and output to change the stream. If more time is needed, add buffering to the pipeline. If playing back off disk, then the system creates the same time delay by reading ahead in the stream.

Also note that commercials can also be detected using the method described in application Ser. No. 09/187,967 entitled "Analog Video Tagging and Encoding System," also owned by the Applicant. The same type of substitution described above can be used when tags described in the aforementioned application are used.

Figure 22:
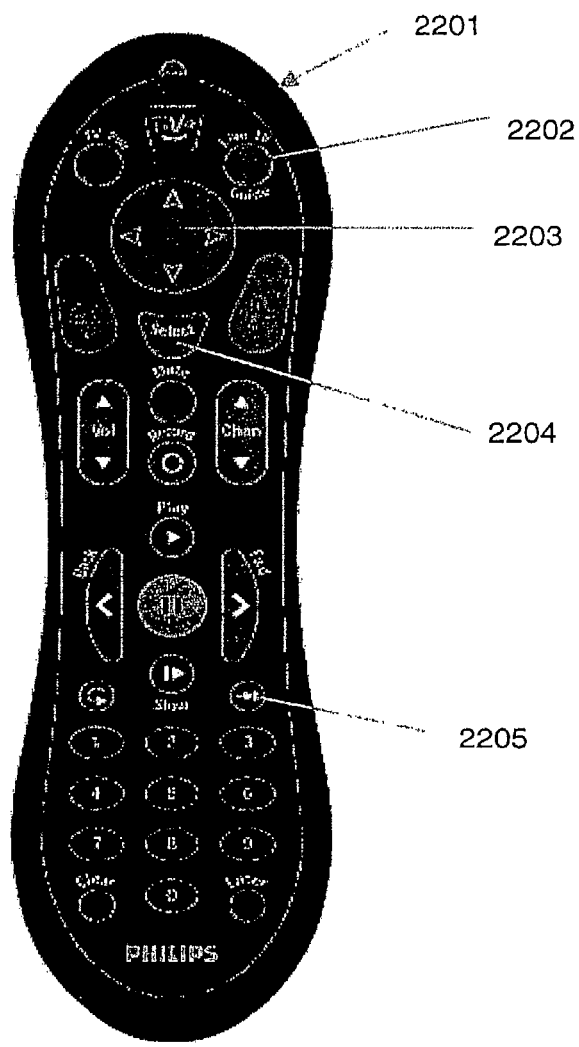
FIG. 22 is a diagram of a viewer remote control device according to the invention.

With respect to FIGS. 19 and 22, tags allow the incorporation of commercial "zapping." Since tags can be used to mark the beginning 1903 and ending 1904 points of a commercial, they can be skipped as well as preempted. The viewer simply presses the jump button 2205 on the remote control 2201. The system searches for the end tag and resumes playback at the frame following the frame associated with the tag. The number of commercials skipped is dependent upon the amount of video stream buffered.

Depending on the viewer's preset preferences, the system 1905 itself can skip commercials on live or prerecorded programs stored in memory 1906. Skipping commercials on live video just requires a larger amount of buffering in the pipeline as described above. Allowing the system to skip commercials on recorded programs presents the viewer with a continuous showing of the program without any commercial interruptions.

Tags are added to program material to act as indexes. The viewer, for example, can jump to each index within the program by pressing the jump button 2205 on the remote control 2201.

Tags are also used for system functions. As noted above, the system locally stores program material for its own use. The system 1905 must somehow receive the program material. This is done by tuning in to a particular channel at off hours. The system 1905 searches for the tag in the stream 1901 that tells it to start recording. The recording is comprised of a number of program segments delimited by tags 1903, 1904 that identify the content and possibly a preference vector. A tag at the end of the stream tells the system 1905 to stop recording. The program segments are stored locally 1906 and indexed for later use as described above.

The invention incorporates the following design points:
The design provides for a clear separation of mechanism and policy.
Internally, tags are viewed as abstract events which trigger policy modules. Mapping of received tag information to these internal abstractions is the responsibility of the source pipeline object.
Abstract tags are stored in the PesBuf stream as if they were just another segment. This allows the handling of arbitrary sized tags with precise timing information. It also allows tags to persist as part of recorded programs, so that proper actions are taken no matter when the program is viewed.
Tags may update information about the current program, future programs, etc. This information is preserved for recorded programs.
Tags can be logged as they pass through the system. It also possible to upload this information. It may not be necessary to preserve all information associated with a tag.
Tags can be generated based on separate timelines. For example, using a network station log to generate tags based on time and network being viewed. Time-based tags are preserved in recorded streams.

Time-Based Tags

Figure 20:
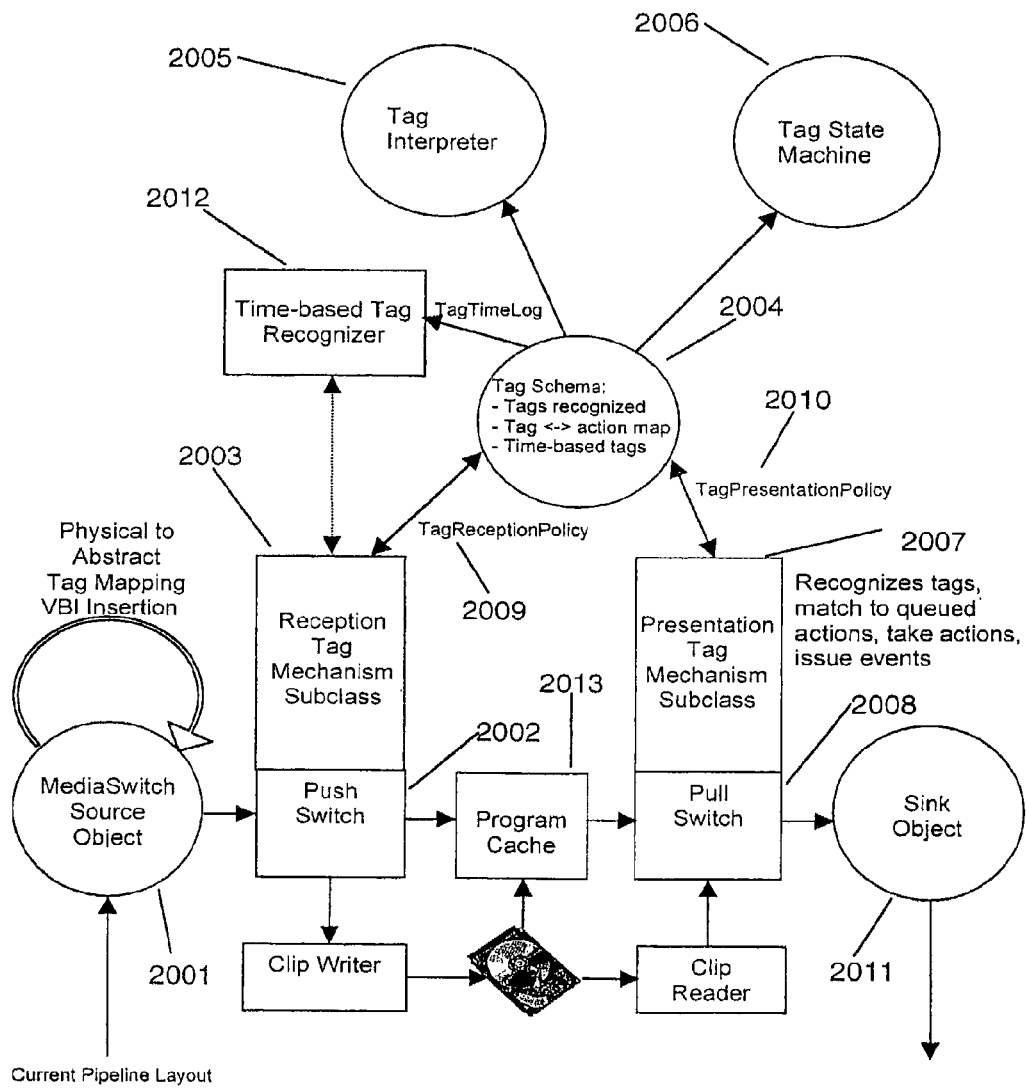
FIG. 20 is a block schematic diagram of a preferred embodiment of the invention that interprets tags inserted into a video stream according to the invention.
Figure 21:
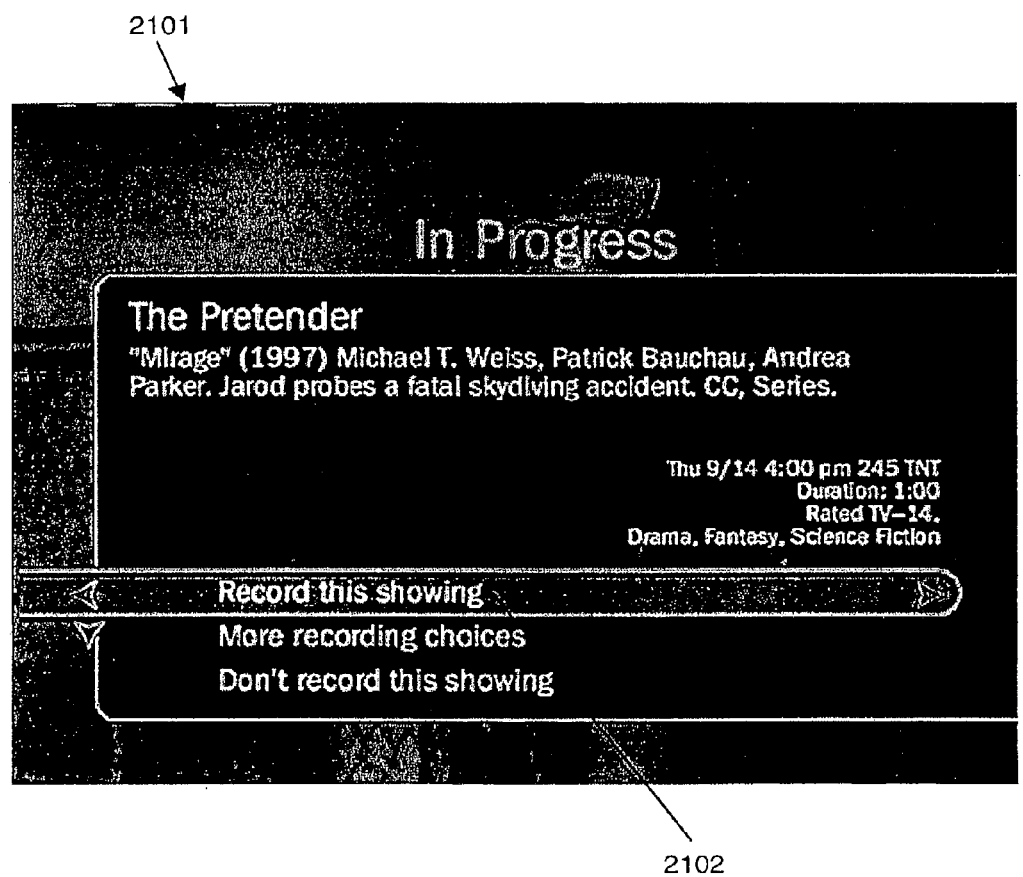
FIG. 21 is a diagram of a screen displaying program recording options according to the invention.

Referring to FIG. 20, time-based tags are handled by a Time-based Tag Recognizer 2012. This object 2012 listens for channel change events and, when a known network is switched to, attempts to retrieve a "time log" for that network. If one is present, the object 2012 builds a tag schedule based on the current time. As the time occurs for each tag, the object 2012 sends an event to the source object 2001 indicating the tag to be inserted. The source object 2001 inserts the tag into the next available position in the current PesBuf under construction. The next "available" position may be determined based on frame boundaries or other conditions.

The Role of the Source Object

The source object 2001 is responsible for inserting tags into the PesBuf stream it produces. This is assuming there are separate source objects for analog input and digital TV sources.

There are a number of different ways that tags may appear in an analog stream:
Within the EDS field.
Implicitly using the CC field.
Modulated onto the VBI, perhaps using the ATVEF specification.
Time Based In a digital TV stream, or after conversion to MPEG from analog:
In-band, using TiVo Tagging Technology.
MPEG2 Private data channel.
MPEG2 stream features (frame boundaries, etc.).

Time-based tags.

The source object 2001 is not responsible for parsing the tags and taking any actions. Instead, the source object 2001 should solely be responsible for recognizing potential tags in the stream and adding them to the PesBuf stream.

Tag Recognition and Action

Conceptually, all tags may be broken up into two broad groups: those that require action upon reception, such as recording a program; and those that require action upon presentation, i.e., when the program is viewed.

Reception Tag Handling

Tags that require action upon reception are handled as follows: a new Reception Tag Mechanism subclass 2003 of the TmkPushSwitch class 2002 is created. As input streams pass through this class 2003 between the source object 2001 and the program cache transform 2013, the class 2003 recognizes reception tags and takes appropriate actions.

Reception tags are generally handled once and then disabled.

Presentation Tag Handling

Tags that require actions upon presentation are handled as follows: a new Presentation Tag Mechanism subclass 2007 of the TmkPullSwitch class 2008 is created. As output streams pass through this class 2007 between the program cache transform 2013 and the sink object 2011, the class 2007 recognizes presentation tags and takes appropriate actions.

Tag Policy Handling

Tag reception handling is only permitted if there is a TagReceptionPolicy object 2009 present for the current channel. Tag presentation handling is only permitted if there is a TagPresentationPolicy object 2010 for the source channel.

The TagPolicy objects describe which tags are to be recognized, and what actions are allowed.

When an input channel change occurs, the reception tag object is notified, and it fetches the TagReceptionPolicy object 2009 (if any) for that channel, and obeys the defined policy.

When an output channel change occurs, the presentation tag object is notified, and it fetches the TagPresentationPolicy object 2010 (if any) for that channel, and obeys the defined policy.

Tag Logging

The reception of tags may be logged into the database. This only occurs if a TagReceptionPolicy object 2009 is present, and the tag logging attribute is set. As an example, the logging attribute might be set, but no reception actions allowed to be performed. This allows passive logging of activity in the input stream.

Pipeline Processing Changes

It is important to support updates of information about the current showing. The following strategy is proposed:

Whenever the input source is changed or a new showing starts, a copy is made of the showing object, and all further operations in the pipeline work off this copy.

Update tags are reception tags; if permitted by policy, the copied showing object is updated.

If the current showing is to be recorded, the copy of the showing object is saved with it, so that the saved program has the proper information saved with it.

The original showing object is not modified by this process.

The recorder must be cognizant of changes to the showing object, so that it doesn't, for instance, cut off the baseball game early.

Tag Interpretation vs. Tag State Machine

Tags are extremely flexible in that, once the TagPolicy object has been used to identify a valid tag, standardized abstract tags are interpreted by the Tag Interpreter 2005 and operational tags are executed by the TiVo Tag State Machine 2006. Interpreted tags trigger a predefined set of actions. Each set of actions have been preprogrammed into the system.

State machine tags are operational tags that do not carry executable code, but perform program steps. This allows the tag originator to combine these tags to perform customized actions on the TiVo system. State machine tags can be used to achieve the same results as an interpreted tag, but have the flexibility to dynamically change the set of actions performed.

Abstract Interpreted Tags

The set of available abstract tags is defined in a table called the Tag/Action table. This table is typically stored in a database object. There are a small number of abstract actions defined. These actions fall into three general categories:

Viewer visible actions (may include interaction).

Meta-information about the stream (channel, time, duration, etc.).

TiVo control tags.

Tags which cause a change to the on-disk database, or cause implicit recording, must be validated. This is accomplished through control tags.

Viewer Visible Tags

-Menu

This tag indicates that the viewer is to be presented with a choice. The data associated with the tag indicates what the choice is, and other interesting data, such as presentation style. A menu has an associated inactivity timeout.

The idea of the menu tag is that the viewer is offered a choice. If the viewer isn't present, or is uninterested, the menu should disappear quickly. The menu policy may or may not be to pause the current program. The presentation of the menu does not have to be a list.

-Push Alternate Program Conditional

This tag indicates that some alternate program should be played if some condition is true. The condition is analyzed by the policy module. It may always be true.

-Pop Alternate Program Conditional

This tag reverts to the previous program. If a program ends, then the alternate program stack is popped automatically. All alternate programs are popped if the channel is changed or the viewer enters the TiVo Central menu area.

Alternate programs are a way of inserting arbitrary sequences into the viewed stream. The conditional data is not evaluated at the top level. Instead, the policy module must examine this data to make choices. This, for example, can be used to create "telescoping" ads.

-Show Indicator Conditional

This tag causes an indication to be drawn on the screen. Indicators are named, and the set of active indicators may be queried at any time. The tag or tag policy may indicate a timeout value at which time the indicator is derived.

-Clear Indicator Conditional

This tag causes an active indication to be removed. All indicators are cleared if the channel is changed or the viewer enters the TiVo Central menu area.

Indicators are another way to offer a choice to the viewer without interrupting program flow. They may also be used to indicate conditions in the stream that may be of interest. For example, "Active Promo" is created by providing a program object ID as part of the tag data, allowing that program to be selected. If the viewer hits a particular key while the indicator is up, then the program is scheduled for recording.

Meta-Information Tags
-Current Showing Information
   This tag is a general bucket for information about the current showing. Each tag typically communicates one piece of information, such as the start time, end time, duration, etc. This tag can be used to "lengthen" a recording of an event.
-Future Showing Information
   This tag is similar to the above, but contains information about a future showing. There are two circumstances of interest:
   The information refers to some showing already resident in the database. The database object is updated as appropriate.
   The information refers to a non-existent showing. A new showing object is created and initialized from the tag.
TiVo Control Tags
-Authorize Modification
   This tag is generally encrypted with the current month's security key. The lifetime of the authorization is set by policy, probably to an hour or two. Thus, the tag needs to be continually rebroadcast if modifications to local TiVo system states are permitted.
   The idea of this tag is to avoid malicious (or accidental) attacks using inherently insecure tag mechanisms such as EDS. If a network provides EDS information, we first want to ensure that their tags are accurate and that attacks on the tag delivery system are unlikely. Then, we would work with that network to provide an authorization system that carouseled authorization tags on just that network. Unauthorized tags should never be inserted into the PES stream by the source object.
-Record Current Conditional
   This tag causes the current program to be saved to disk starting from this point. The recording will cease when the current program ends.
-Stop Recording Current Conditional
   This tag ceases recording of the current program.
-Record Future Conditional
   A showing object ID is provided (perhaps just sent down in a Future Showing tag). The program is scheduled for recording at a background priority lower than explicit viewer selections.
-Cancel Record Future Conditional
   A showing object ID is provided. If a recording was scheduled by a previous tag for that object, then the recording is canceled.
   These tags, and the Future Showing tag, may be inserted in an encrypted, secure format. The source object will only insert these tags in the PES stream if they are properly validated.
   One of the purposes of these tags is to automatically trigger recording of TiVo inventory, such as loopsets, advertisements, interstitials, etc. A later download would cause this inventory to be "installed" and available.
-Save File Conditional
   This tag is used to pass data through the stream to be stored to disk. For instance, broadcast Web pages would be passed through this mechanism.
-Save Object Conditional
   This tag is used to pass an object through the stream to be stored to disk. Storing the object follows standard object updating rules.
   The following is an example of an implementation using presentation tags inserted into the Closed Captioning (CC) part of a stream. The CC part of the stream was chosen because it is preserved when a signal is transmitted and digitized and decoded before it reaches the user's receiver. There are no guarantees on the rest of the VBI signal. Many of the satellite systems strip out everything except the closed captioning when encoding into MPEG-2.
   There is a severe bandwidth limitation on the CC stream. The data rate for the CC stream is two 7-bit bytes every video frame. Furthermore, to avoid collision with the control codes, the data must start at 0×20, thus effectively limiting it to about 6.5-bit bytes (truncate to 6-bit bytes for simplicity). Therefore, the bandwidth is roughly 360 bits/second. This rate gets further reduced if the channel is shared with real CC data. In addition, extra control codes need to be sent down to prevent CC-enabled televisions from attempting to display the TiVo tags as CC text.
Basic Tag Layout
   This section describes how the tags are laid out in the closed captioning stream. It assumes a general familiarity with the closed captioning specification, though this is not crucial.
Making Tags Invisible
   A TiVo Tag placed in a stream should not affect the display on a closed captioning enabled television. This is achieved by first sending down a "resume caption loading" command (twice for fault tolerance), followed by a string of characters that describes the tag followed by an "erase nondisplayed memory" command (twice for fault tolerance). What this does is to load text into offscreen memory, and then clear the memory. A regular TV with closed captioning enabled will not display this text (as per EIA-701 standard).
   This works as long as the closed captioning decoder is not in "roll-up" or "scrolling" mode. In this mode, a "resume caption loading" command would cause the text to be erased. To solve this problem, TiVo Tags will be accepted and recognized even if they are sent to the second closed captioning channel. This way, even if closed captioning channel 1 is set up with scrolling text, we can still send the tag through closed captioning channel 2.
Tag Encoding
   The text sent with a TiVo Tag consists of the letters "Tt", followed by a single character indicating the length of the tag, followed by the tag contents, followed by a CRC for the tag contents. The letters "Tt" are sufficiently unique that it is unlikely to encounter these in normal CC data. Furthermore, normal CC data always starts with a position control code to indicate where on the screen the text is displayed. Since we are not displaying onscreen, there is no need for this positioning data. Therefore, the likelihood of encountering a "Tt" immediately after a "resume caption loading" control code is sufficiently rare that we can almost guarantee that this combination is a TiVo tag (though the implementation still will not count on this to be true).
   The single character indicating the length of the tag is computed by adding the tag length to 0×20. If the length is 3 characters, for example, then the length character used is 0×23 ('#'). So as not to limit the implementation to a length of 95 (since there are only 96 characters in the character set), the maximum length is defined as 63. If longer tags are needed, then an interpretation for the other 32 possible values for the length character can be added.
   The possible values for the tag itself are defined in the Tag Types section below.
   The CRC is the 16 bit CRC-CCITT (i.e., polynomial=$x^{16}+x^{12}+x^5+1$). It is placed in the stream as three separate characters. The first character is computed by adding 0×20 to the most significant six bits of the CRC. The next character is computed by adding 0×20 to the next six bits of the CRC. The last character is computed by adding 0×20 to the last four bits of the CRC.

Tag Types

This section details an example of a TiVo Tag. Note that every tag sequence begins with at least one byte indicating the tag type.

iPreview Tag

Figure 17:
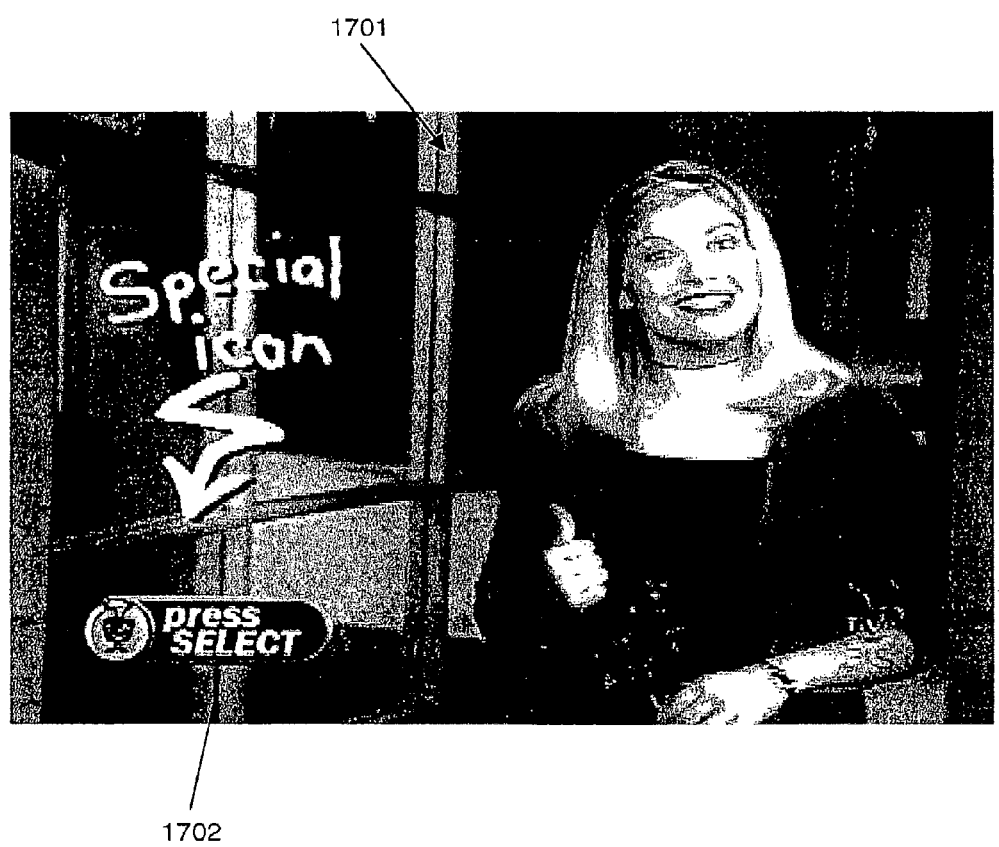
FIG. 17 is a diagram of a screen with an alert icon displayed in the lower left corner of the screen according to the invention.

With respect to FIG. 17, an iPreview tag contains four pieces of information. The first is the 32 bit program ID of the program being previewed. The second contains how much longer the promotion is going to last. The third piece is where on the screen 1701 to place an iPreview alert 1702 and the last piece is what size iPreview alert to use.

The screen location for the iPreview alert is a fraction of the screen resolution in width and height. The X coordinate uses 9 bits to divide the width, so the final coordinate is given as: X=(x_resolution/511) * xval. If the xval is given as 10, on a 720×486 screen (using CCIR656 resolution), the X coordinate would be 14. The Y coordinate uses 8 bits to divide the height, so the final coordinate is given as: Y=(y_resolution/255) * yval. The X,Y coordinates indicate the location of the upper-left corner of the bug graphic.

If the value of X and Y are set to the maximum possible values (i.e., x=511, y=255), then this indicates that the author is giving the system the job of determining its position. The system will place the bug at a predetermined default position. The rationale for using the max values to indicate the default position is that it is never expected that a "real" position will be set to these values since that would put the entire bug graphic offscreen.

The size field is a four bit number that indicates what size any alert graphic should be. The 16 possible values of this field correspond to predefined graphic sizes that the settop boxes should be prepared to provide.

The timeout is a ten bit number indicating the number of frames left in the promotion. This puts a 34 second lifetime limit on this tag. If a promotion is longer, then the tag needs to be repeated. Note that the timeout was "artificially limited" to 10 bits to limit exposure to errors. This is to limit the effect it will have on subsequent commercials if an author puts a malformed timeout in the tag.

The version is a versioning number used to identify the promo itself. Instead of bit-packing this number (and thus limiting it to 6 bits), the full closed captioning character set is used, which results in 96 possibilities instead of 64 (2^6). The version number thus needs to be within the range 0-95.

The reserved character is currently unused. This character needs to exist so that the control codes end up properly aligned on the 2-byte boundaries.

The first character of an iPreview tag is always "i".

All of the data fields are packed together on a bit boundary, and then broken into six bit values which are converted into characters (by adding 0×20) and transmitted. The order of the fields are as follows:

32 bits: program ID
9 bits: X location
8 bits: Y location
4 bits: graphic size
10 bits: timeout
1 character: version
1 character: reserved The data fields total 66 bits which requires 11 characters to send+1 character for version and 1 character for reserved. The exact contents of each character are:

1) 0×20 +ID[31:26]
2) 0×20 +ID[25:20]
3) 0×20 +ID[19:14]
4) 0×20 +ID[13:8]
5) 0×20+ID[7:2]
6) 0×20+ID[1:0] X[8:5]
7) 0×20+X[4:0] Y[7]
8) 0×20+Y[6:1]
9) 0×20+Y[0] size[3:0]
10) 0×20+Y[0] size[3:0] timeout[9]
11) 0×20+timeout[8:3]
12) 0×20+timeout[2:0]
13) 0×20+version
14) reserved Including the first character "i", the length of the iPreview tag is 14 characters+3 CRC characters. With the tag header (3 characters), this makes a total length of 20 characters which can be sent down over 10 frames. Adding another 4 frames for sending "resume caption loading" twice and "erase nondisplayed memory" twice means an iPreview tag will take 14 frames (0.47 seconds) to broadcast.

A complete iPreview tag consists of:

Resume caption loading Resume caption loading T t 1 (0×20+17=0×31=0110001="1") i<13 character iPreview tag>3 character CRC Erase nondisplayed memory Erase nondisplayed memory Parity Debugging Character Currently, the parity bit is being used as a parity bit. However, since a CRC is already included, there is no need for the error-checking capabilities of the parity bit. Taking this a step further, the parity bit can be used in a clever way. Since a closed captioning receiver should ignore any characters with an incorrect parity bit, a better use of the limited bandwidth CC channel can be had by intentionally using the wrong parity. This allows the elimination of the resume caption loading and erase nondisplayed memory characters, as well as making it easier to "intersperse" TiVo tags among existing CC data.

iPreview Viewer Interaction

Referring to FIGS. 17, 20, 21 and 22, the iPreview tag causes the Tag Interpreter 2005 to display the iPreview alert 1702 on the screen 1701. The iPreview alert 1702 tells the viewer that an active promo is available and the viewer can tell the TiVo system to record the future showing. The viewer reacts to the iPreview alert 1702 by pressing the select button 2204 on the remote control 2201.

The Tag Interpreter 2005 waits for the user input. Depending on the viewer's preset preferences, the press of the select button 2204 results in the program automatically scheduled by the Tag Interpreter 2005 for recording, resulting in a one-touch record, or the viewer is presented with a record options screen 2101. The viewer highlights the record menu item 2102 and presses the select button 2204 to have the program scheduled for recording.

The tag itself has been interpreted by the Tag Interpreter 2005. The Tag Interpreter 2005 waits for any viewer input through the remote control 2201. Once the viewer presses the select button 2204, the Tag Interpreter 2005 tells the TiVo system to schedule a recording of the program described by the 32 bit program ID in the iPreview tag.

Figure 23:
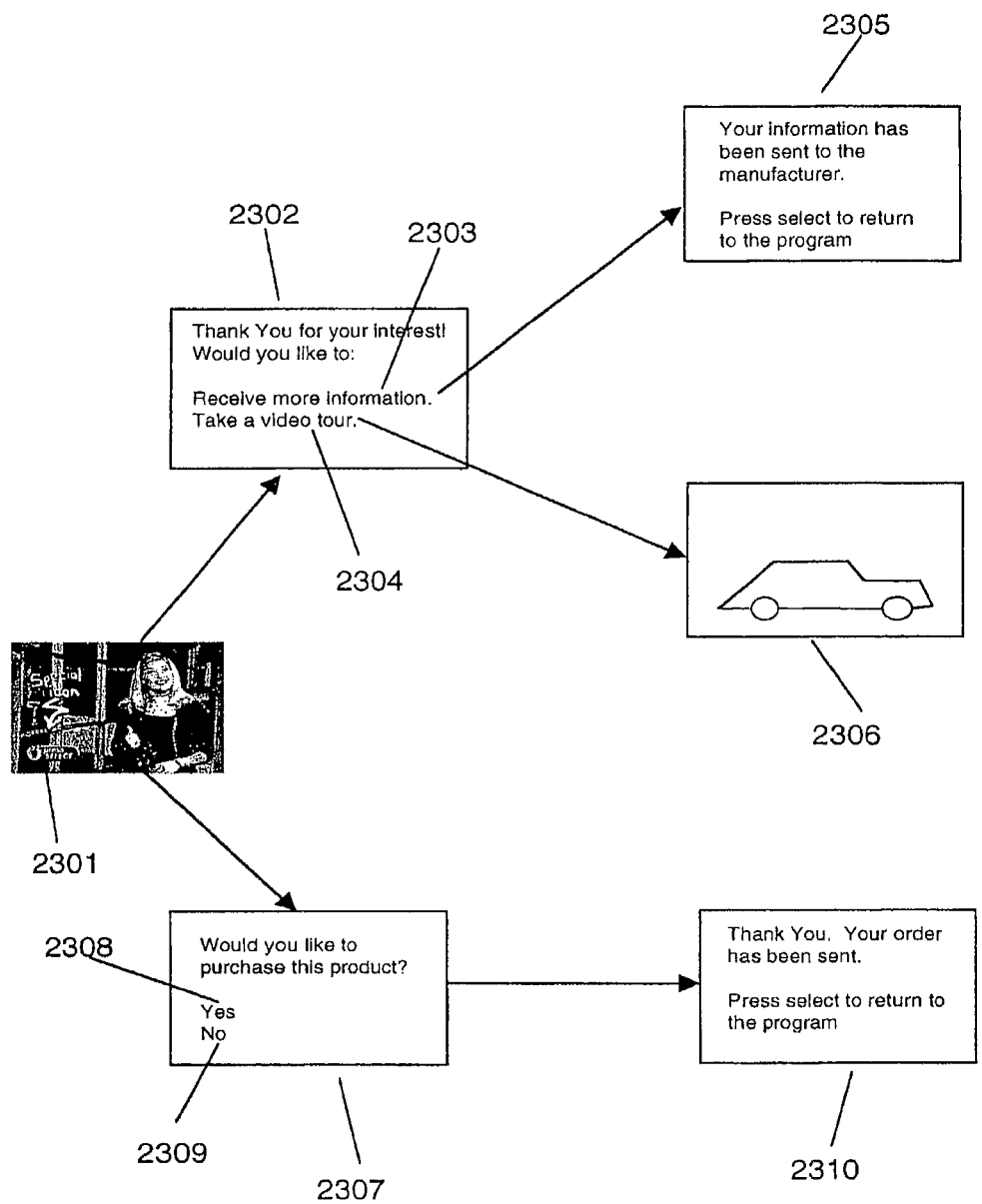
FIG. 23 is a block schematic diagram of a series of screens for lead and sale generation according to the invention.

With respect to FIGS. 20, 22, and 23, the iPreview tag is also used for other purposes. Each use is dictated by the context of the program material and the screen icon displayed. Obviously the system cannot interpret the program material, but the icon combined with the program ID tells the Tag Interpreter 2005 what action to take. Two examples are the generation of a lead and a sale.

The process of generating a lead occurs when, for example, a car ad is being played. An iPreview icon appears 2301 on the screen and the viewer knows that he can press the select button 2204 to enter an interactive menu.

A menu screen 2302 is displayed by the Tag Interpreter 2005 giving the user the choice to get more information 2303 or see a video of the car 2304. The viewer can always exit by pressing the live TV button 2202. If the viewer selects get more information 2303 with the up and down arrow button 2203 select button 2204, then the viewer's information is sent to the manufacturer 2305 by the Tag Interpreter 2005, thereby generating a lead. The viewer returns to the program by pressing the select button 2204.

Generating a sale occurs when a product, e.g., a music album ad, is advertised. The iPreview icon 2301 appears on the screen. The viewer presses the select button 2204 and a menu screen 2307 is displayed by the Tag Interpreter 2005.

The menu screen 2307 gives the viewer the choice to buy the product 2308 or to exit 2309. If the viewer selects yes 2308 to buy the product, then the Tag Interpreter 2005 sends the order to the manufacturer with the viewer's purchase information 2310. If this were a music album ad, the viewer may also be presented with a selection to view a music video by the artist.

Whenever the system returns the viewer back to the program, it returns to the exact point that the viewer had originally exited from. This gives the viewer a sense of continuity.

The concept of redirection is easily expanded to the Internet. The iPreview icon will appear as described above. When the viewer presses the select button 2204 on the remote control 2201, a Web page is then displayed to the viewer. The viewer then interacts with the Web page and when done, the system returns the viewer back to the program that he was watching at the exact point from which the viewer had exited.

Using the preference engine as noted above, the information shown to the viewer during a lead or sale generation is easily geared toward the specific viewer. The viewer's viewing habits, program preferences, and personal information are used to select the menus, choices, and screens presented to the viewer. Each menu, choice and screen has an associated program object that is compared to the viewer's preference vector.

For example, if a viewer is male and the promo is for Chevrolet, then when the viewer presses the select button, a still of a truck is displayed. If the viewer were female, then a still of a convertible would be displayed.

Note that the Tag State Machine 2006 described below is fully capable of performing the same steps as the Tag Interpreter 2005 in the above examples.

The TiVo Tag State Machine

Referring again to FIG. 20, a preferred embodiment of the invention provides a Tag State Machine (TSM) 2006 which is a mechanism for processing abstract TiVo tags that may result in viewer-visible actions by the TiVo Receiver.

A simple example is the creation of an active promo. As demonstrated above, an active promo is where a promotion for an upcoming show is broadcast and the viewer is immediately given the option of having the TiVo system record that program when it actually is broadcast.

Hidden complexities underlie this simple example: some indicator must be generated to alert the viewer to the opportunity; the indicator must be brought into view or removed with precision; accurate identification of the program in question must be provided; and the program within which the active promo appears may be viewed at a very different time then when it was broadcast.

Creation and management of the TiVo tags are also challenging. It is important to cause as little change as possible to existing broadcast practices and techniques. This means keeping the mechanism as simple as possible for both ease of integration into the broadcast stream and for robust and reliable operation.

Principles of Tags

As previously noted, it is assumed that the bandwidth available for sending tags is constrained. For example, the VBI has limited space available which is under heavy competition. Even in digital television signals, the amount of out-of-band data sent will be small since most consumers of the signal will be mainly focused on television programming options.

A tag is then a simple object of only a few bytes in size. More complex actions are built by sending multiple tags in sequence.

The nature of broadcast delivery implies that tags will get lost due to signal problems, sunspots, etc. The TSM incorporates a mechanism for handling lost tags, and insuring that no unexpected actions are taken due to lost tags.

In general, viewer-visible tag actions are relevant only to the channel on which they are received; it is assumed that tag state is discarded after a channel change.

Physical tags are translated into abstract tags by the source object 1901 receiving the physical tag. Tags are not "active agents" in that they carry no executable code; functioning the TSM may result in viewer-visible artifacts and changes, but the basic operation of the TiVo receiver system will remain unaffected by the sequence of tags. If tags could contain executable code, such as the Java byte streams contemplated by the ATVEF, the integrity of the TiVo viewing experience might be compromised by poorly written or malicious software.

All tag actions are governed by a matching policy object matched to the current channel. Any or all actions may be enabled or disabled by this object; the absence of a policy object suppresses all tag actions.

The Basic Abstract Tag

All abstract tags have a common infrastructure. The following components are present in any abstract tag:

-Tag Type (1 Byte)

The type 0 is disallowed. The type 255 indicates an "extension" tag, should more than 254 tag values be required at some future time.

-Tag Sequence (1 Byte)

This unsigned field is incremented for each tag that is part of a sequence. Tags which are not part of a sequence must have this field set to zero. A tag sequence of one indicates the start of a new sequence; a sequence may be any length conceptually, but it will be composed of segments of no more than 255 tags in order.

Each tag type has an implicit sequence length (which may be zero); the sequence number is introduced to handle dropouts or other forms of tag loss in the stream. In general, if a sequence error occurs, the entire tag sequence is discarded and the state machine reset.

Tags should be checksummed in the physical domain. If the checksum doesn't match, the tag is discarded by the source object. This will result in a sequence error and reset of the state machine.

-Tag Timestamp (8 Bytes)

This is the synchronous time within the TV stream at which the tag was recognized. This time is synchronous to all other presentation times generated by the TiVo Receiver. This component is never sent, but is generated by the receiver itself.

-Tag Data Length (2 Bytes)

This is the length of any data associated with the tag. The interpretation of this data is based on the tag type. The physical domain translator should perform some minimal error checking on the data.

The Tag State Machine

The TSM is part of the Tag Presentation Mechanism, which is in-line with video playback.

Conceptually, the TSM manages an abstract stack of integer values with at least 32 bits of precision, or sufficient size to hold an object ID. The object ID is abstract, and may or may not indicate a real object on the TiVo Receiver—it may otherwise need to be mapped to the correct object. The stack is limited in size to 255 entries to limit denial-of-service attacks.

The TSM also manages a pool of variables. Variables are named with a 2-byte integer. The variable name 0 is reserved. "User" variables may be manipulated by tag sequences; such variables lie between 1 and 2^15-1. "System" variables are maintained by the TSM, and contain values about the current TiVo Receiver, such as: the current program object ID; the TSM revision; and other useful information. These variables have names between 2^15 and 2^16-1. The number of user variables may be limited within a TSM; a TSM variable indicates what this limit is.

The tag data is a sequence of TSM commands. Execution of these commands begins when the tag is recognized and allowed. TSM commands are byte oriented and certain commands may have additional bytes to support their function.

The available TSM commands may be broken down into several classes:

Data Movement Commands push_byte—push the byte following the command onto the stack.

push_short—push the short following the command onto the stack.

push_word—push the word following the command onto the stack.

Variable Access Commands push_var—push the variable named in the 16-bit quantity following the command.

pop_var—pop into the variable named in the 16-bit quantity following the command.

copy_var—copy into the variable named in the 16-bit quantity following the command from the stack.

Stack Manipulation Commands swap—swap the top two stack values.

pop—toss the top stack value.

Arithmetic Commands add_byte—add the signed byte following the command to the top of stack.

add_short—add the signed short following the command to the top of stack.

add_word—add the signed word following the command to the top of stack.

and—and the top and next stack entries together, pop the stack and push the new value.

or—or the top and next stack entries together, pop the stack and push the new value.

Conditional Commands (Unsigned Comparisons Only)

brif_zero—branch to the signed 16-bit offset following the command if the top of stack is zero.

brif_nz—branch to the signed 16-bit offset following the command if the top of stack is not zero.

brif_gt—branch to the signed 16-bit offset following the command if the top of stack is greater than the next stack entry.

brif_ge—branch to the signed 16-bit offset following the command if the top of stack is greater than or equal to the next stack entry.

brif_le—branch to the signed 16-bit offset following the command if the top of stack is less than or equal to the next stack entry.

brif_lt—branch to the signed 16-bit offset following the command if the top of stack is less than the next stack entry.

brif_set—branch to the signed 16-bit offset following the command if there are bits set when the top and next stack entries are ANDed together.

Action Commands exec—execute tag action on the object ID named on top of stack.

fin—terminate tag taking no action.

System Variables

32768 (TAG)—value of current tag.

Times in GMT:

32769 (YEAR)—current year (since 0).

32770 (MONTH)—current month (1-12).

32771 (DAY)—day of month (1-31).

32772 (WDAY)—day of week (1-7, starts Sunday).

32773 (HOUR)—hour of the day (0-23).

32774 (MIN)—minute of the hour (0-59).

32775 (SEC)—seconds of the minute (0-59).

TiVo Receiver State:

32800 (SWREL)—software release (in x.x.x notation in bytes).

32801 (NTWRK)—object ID of currently tuned network.

32802 (PRGRM)—object ID of currently tuned program.

32803 (PSTATE)—current state of output pipeline:

0—normal playback

1—paused

2—slo-mo

10—rewind speed 1

11—rewind speed 2

. . .

20—ff speed 1

21—ff speed 2

. . .

Tag Execution State:

32900 (IND)—indicator number to display or take down.

32901 (PDURING)—state of the pipeline while tag is executing.

32902 (ALTP)—alternate program object ID to push on play stack.

32903 (SELOBJ)—program object ID to record if indicator selected.

33000 (MENU1)—string object number for menu item 1.

33001 (MENU2)—string object number for menu item 2.

. . .

33009 (MENU10)—string object number for menu item 9.

33100 (PICT1)—picture object number for menu item 1.

33101 (PICT2)—picture object number for menu item 2.

. . .

33109 (PICT10)—picture object number for menu item 10.

33200 (MSELOBJ1)—program object ID to record if menu item selected.

33201 (MSELOBJ2)—program object ID to record if menu item selected.

. . .

33209 (MSELOBJ10)—program object ID to record if menu item selected.

Tags

Push Alternate Program

Pop Alternate Program (auto-pop at end of program)

Raise Indicator

Lower Indicator

Menu

Tag Execution Policy

Execution policy is determined by the TSM. Some suggestions are:

-Menus

Menus are laid out as per standard TiVo menu guidelines. In general, menus appear over live video. Selection of an item typically invokes the record dialog. It may be best to pause the pipeline during the menu operation.

-Indicators

With respect to FIGS. 17 and 22, indicators 1702 are lined up at the bottom of the display as small icons. During the normal viewing state, the up arrow and down arrow keys 2203 on the remote control 2201 do nothing. For indicators, up arrow 2203 circles through the indicators to the left, down arrow to the right. The selected indicator has a small square drawn around it. Pushing select 2204 initiates the action. New indicators are by default selected; if an indicator is removed, the previously selected indicator is highlighted, if any.

-Alternate Programs

Alternate programs should appear as part of the video stream, and have full ff/rew controls. The skip to live button 2202 pops the alternate program stack to empty first.

Although the closed caption stream is specifically mentioned above, other transport methods can be used such as the EDS fields, VBI, MPEG2 private data channel, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
   detecting one or more tags in a broadcast stream, the one or more tags including a program identifier;
   displaying an icon responsive to detecting the one or more tags, the icon being displayed concurrently with a promotional advertisement for a program and the icon indicating that the program is available for recording, the one or more tags further including indicator icon information that identifies which indicator icon, of a plurality of available indicator icons, corresponds to the icon to display;
   detecting a viewer pressing a particular single button on an input device while the icon and the promotional advertisement for the program are concurrently displayed;
   using the program identifier in the one or more tags to locate a database object associated with the program identifier, the database object including a start time for the program that was not indicated in the one or more tags;
   based on the database object, automatically scheduling the program for recording at the start time responsive to the viewer pressing the particular single button.

2. The method of claim 1, further comprising storing a viewer's preferences for, in response to detecting pressing of the particular single button, one of: automatically scheduling an advertised program for recording or presenting recording options.

3. The method of claim 1, wherein the one or more tags do not indicate a start time or channel for the program.

4. The method of claim 1, further comprising maintaining a database of database objects, including the database object, the database objects at least associating program identifiers with start times.

5. The method of claim 1, further comprising determining how long to display the icon based at least in part on timing information within the one or more tags.

6. The method of claim 1, wherein the one or more tags further include indicator icon information that specifies a size of the icon.

7. A method comprising:
   storing a viewer's preferences for, in response to detecting pressing of a particular single button, one of: automatically scheduling an advertised program for recording or presenting recording options;
   detecting one or more tags in a broadcast stream, the one or more tags including a program identifier;
   displaying an icon responsive to detecting the one or more tags, the icon being displayed concurrently with a promotional advertisement for a program and the icon indicating that the program is available for recording;
   detecting a viewer pressing the particular single button on an input device while the icon and the promotional advertisement for the program are concurrently displayed;
   based on the program identifier in the one or more tags, locating a database object associated with the program identifier, the database object including a start time for the program;
   based on the database object, automatically scheduling the program for recording responsive to the viewer pressing the particular single button, wherein scheduling the program for recording is based at least in part on the viewer's preferences.

8. A non-transitory computer readable medium comprising instructions which, when executed by one or more processors, cause performance of:
   detecting one or more tags in a broadcast stream, the one or more tags including a program identifier;
   displaying an icon responsive to detecting the one or more tags, the icon being displayed concurrently with a promotional advertisement for a program and the icon indicating that the program is available for recording, the one or more tags further including indicator icon information that identifies which indicator icon, of a plurality of available indicator icons, corresponds to the icon to display;
   detecting a viewer pressing a particular single button on an input device while the icon and the promotional advertisement for the program are concurrently displayed;
   using the program identifier in the one or more tags to locate a database object associated with the program identifier, the database object including a start time for the program that was not indicated in the one or more tags;
   based on the database object, automatically scheduling the program for recording at the start time responsive to the viewer pressing the particular single button.

9. The computer readable medium of claim 8, wherein the instructions, when executed by the one or more processors, further cause: storing a viewer's preferences for, in response to detecting pressing of the particular single button, one of:
   automatically scheduling an advertised program for recording or presenting recording options.

10. The computer readable medium of claim 8, wherein the one or more tags do not indicate a start time or channel for the program.

11. The computer readable medium of claim 8, wherein the instructions, when executed by the one or more processors, further cause: maintaining a database of database objects, including the database object, the database objects at least associating program identifiers with start times.

12. The computer readable medium of claim 8, wherein the instructions, when executed by the one or more processors, further cause: determining how long to display the icon based at least in part on timing information within the one or more tags.

13. The computer readable medium of claim 8, wherein the one or more tags further include indicator icon information that specifies a size of the icon.

14. A non-transitory computer readable medium, comprising instructions which, when executed by one or more processors, cause performance of:
storing a viewer's preferences for, in response to detecting pressing of a particular single button, one of: automatically scheduling an advertised program for recording or presenting recording options;
detecting one or more tags in a broadcast stream, the one or more tags including a program identifier;
displaying an icon responsive to detecting the one or more tags, the icon being displayed concurrently with a promotional advertisement for a program and the icon indicating that the program is available for recording;
detecting a viewer pressing the particular single button on an input device while the icon and the promotional advertisement for the program are concurrently displayed;
based on the program identifier in the one or more tags, locating a database object associated with the program identifier, the database object including a start time for the program;
based on the database object, automatically scheduling the program for recording responsive to the viewer pressing the particular single button, wherein scheduling the program for recording is based at least in part on the viewer's preferences.

15. A device, comprising:
one or more processors;
a parser configured to detect one or more tags in a broadcast stream, the one or more tags including a program identifier;
an on-screen display generator configured to cause display of an icon responsive to the detection of the one or more tags, the icon being displayed concurrently with a promotional advertisement for a program and the icon indicating that the program is available for recording, the one or more tags further including indicator icon information that identifies which indicator icon, of a plurality of available indicator icons, corresponds to the icon to display;
a control object component configured to detect input indicating a viewer pressing a particular single button on an input device while the icon and the promotional advertisement for the program are concurrently displayed;
program logic configured to, when executed by the one or more processors, use the program identifier in the one or more tags to locate a database object associated with the program identifier, the database object including a start time for the program that was not indicated in the one or more tags, and based on the database object, automatically schedule the program for recording at the start time responsive to the detection of the viewer pressing the particular single button.

16. The device of claim 15, wherein the program logic is further configured to, when executed by the one or more processors, store a viewer's preferences for, in response to detection of pressing of the particular single button, one of: automatically scheduling an advertised program for recording or presenting recording options.

17. The device of claim 15, wherein the one or more tags do not indicate a start time or channel for the program.

18. The device of claim 15, further comprising: a database component, implemented at least partially by hardware, configured to maintain a database of database objects, including the database object, the database objects at least associating program identifiers with start times.

19. The device of claim 15, wherein the program logic is further configured to, when executed by the one or more processors: determine how long to display the icon based at least in part on timing information within the one or more tags.

20. The device of claim 15, wherein the one or more tags further include indicator icon information that specifies a size of the icon.

21. A device comprising:
one or more processors;
program logic configured to, when executed by the one or more processors, store a viewer's preferences for, in response to detection of pressing of the particular single button, one of: automatically scheduling an advertised program for recording or presenting recording options;
a parser configured to detect one or more tags in a broadcast stream, the one or more tags including a pro gram identifier;
an on-screen display generator configured to cause display of an icon responsive to the detection of the one or more tags, the icon being displayed concurrently with a promotional advertisement for a program and the icon indicating that the program is available for recording;
a control object component configured to detect input indicating a viewer pressing a particular single button on an input device while the icon and the promotional advertisement for the program are concurrently displayed;
wherein the program logic is further configured to, when executed by the one or more processors, based on the program identifier in the one or more tags, locate a database object associated with the program identifier, the database object including a start time for the program, and based on the database object, automatically schedule the program for recording responsive to the detection of the viewer pressing the particular single button, wherein scheduling the program for recording is based at least in part on the viewer's preferences.

22. A method comprising:
detecting one or more tags in a broadcast stream, the one or more tags including a program identifier;
displaying an icon responsive to detecting the one or more tags, the icon being displayed concurrently with a promotional advertisement for a program and the icon indicating that the program is available for recording, the one or more tags further including indicator icon information that specifies a size of the icon;
detecting a viewer pressing a particular single button on an input device while the icon and the promotional advertisement for the program are concurrently displayed;
based on the program identifier in the one or more tags, locating a database object associated with the program identifier, the database object including a start time for the program;
based on the database object, automatically scheduling the program for recording responsive to the viewer pressing the particular single button.

23. The method of claim 22, further comprising, based on indicator icon information within the one or more tags, selecting the icon from a plurality of available indicator icons that indicate that promoted programming is available for one-touch recording.

24. The method of claim 22, further comprising storing a viewer's preferences for, in response to detecting pressing of the particular single button, one of: automatically scheduling an advertised program for recording or presenting recording options.

25. The method of claim 22, further comprising determining how long to display the icon based at least in part on timing information within the one or more tags.

26. A non-transitory computer readable medium, comprising instructions which, when executed by one or more processors, cause performance of:
    detecting one or more tags in a broadcast stream, the one or more tags including a program identifier;
    displaying an icon responsive to detecting the one or more tags, the icon being displayed concurrently with a promotional advertisement for a program and the icon indicating that the program is available for recording, the one or more tags further including indicator icon information that specifies a size of the icon;
    detecting a viewer pressing a particular single button on an input device while the icon and the promotional advertisement for the program are concurrently displayed;
    based on the program identifier in the one or more tags, locating a database object associated with the program identifier, the database object including a start time for the program;
    based on the database object, automatically scheduling for recording responsive to the viewer pressing the particular single button.

27. The computer readable medium of claim 26, wherein the instructions, when executed by the one or more processors, further cause: based on indicator icon information within the one or more tags, selecting the icon from a plurality of available indicator icons that indicate that promoted programming is available for one-touch recording.

28. The computer readable medium of claim 26, wherein the instructions, when executed by the one or more processors, further cause storing a viewer's preferences for, in response to detecting pressing of the particular single button, one of: automatically scheduling an advertised program for recording or presenting recording options.

29. The computer readable medium of claim 26, wherein the instructions, when executed by the one or more processors, further cause determining how long to display the icon based at least in part on timing information within the one or more tags.

30. A device comprising:
    one or more processors;
    a parser configured to detect one or more tags in a broadcast stream, the one or more tags including a program identifier;
    an on-screen display generator configured to cause display of an icon responsive to the detection of the one or more tags, the icon being displayed concurrently with a promotional advertisement for a program and the icon indicating that the program is available for recording, the one or more tags further including indicator icon information that specifies a size of the icon;
    a control object component configured to detect input indicating a viewer pressing a particular single button on an input device while the icon and the promotional advertisement for the program are concurrently displayed;
    program logic configured to, when executed by the one or more processors, based on the program identifier in the one or more tags, locate a database object associated with the program identifier, the database object including a start time for the program, and based on the database object, automatically schedule the program for recording responsive to the detection of the viewer pressing the particular single button.

31. The device of claim 30, wherein the program logic is further configured to when executed by the one or more processors, based on indicator icon information within the one or more tags, select the icon from a plurality of available indicator icons that indicate that promoted programming is available for one-touch recording.

32. The device of claim 30, wherein the program logic is further configured to, when executed by the one or more processors, store a viewer's preferences for, in response to detecting pressing of the particular single button, one of: automatically scheduling an advertised program for recording or presenting recording options.

33. The device of claim 30, wherein the program logic is further configured to, when executed by the one or more processors, determine how long to display the icon based at least in part on timing information within the one or more tags.

* * * * *